(12) United States Patent  
Evans

(10) Patent No.: US 7,904,360 B2  
(45) Date of Patent: Mar. 8, 2011

(54) SYSTEM AND METHOD FOR VERIFICATION, AUTHENTICATION, AND NOTIFICATION OF A TRANSACTION

(75) Inventor: Alexander William Evans, New York, NY (US)

(73) Assignee: Alexander William Evans, New York, NY (US)

( * ) Notice: Subject to any disclaimer, the term of this patent is extended or adjusted under 35 U.S.C. 154(b) by 2109 days.

(21) Appl. No.: 10/354,609

(22) Filed: Jan. 30, 2003

(65) Prior Publication Data

US 2004/0078340 A1   Apr. 22, 2004

Related U.S. Application Data

(60) Provisional application No. 60/354,275, filed on Feb. 4, 2002.

(51) Int. Cl.  
*G06Q 40/00* (2006.01)

(52) U.S. Cl. .................. 705/35; 705/38; 705/39

(58) Field of Classification Search .......... 705/26, 705/44, 39, 78, 64, 16, 40, 80, 75, 35, 38; 235/380; 380/30; 348/E5.006  
See application file for complete search history.

(56) References Cited

U.S. PATENT DOCUMENTS

| | | | | |
|---|---|---|---|---|
| 5,590,197 A * | 12/1996 | Chen et al. | | 705/65 |
| 5,727,163 A * | 3/1998 | Bezos | | 705/27 |
| 5,812,668 A * | 9/1998 | Weber | | 705/79 |
| 5,848,161 A * | 12/1998 | Luneau et al. | | 705/78 |
| 6,023,682 A * | 2/2000 | Checchio | | 705/18 |
| 6,026,379 A * | 2/2000 | Haller et al. | | 705/34 |
| 6,088,683 A * | 7/2000 | Jalili | | 705/26 |
| 6,182,894 B1 * | 2/2001 | Hackett et al. | | 235/380 |
| 6,253,193 B1 * | 6/2001 | Ginter et al. | | 705/57 |
| 6,270,011 B1 * | 8/2001 | Gottfried | | 235/379 |
| 6,324,526 B1 * | 11/2001 | D'Agostino | | 705/44 |
| 6,341,724 B2 * | 1/2002 | Campisano | | 235/380 |
| 6,363,363 B1 * | 3/2002 | Haller et al. | | 705/40 |
| 6,363,488 B1 * | 3/2002 | Ginter et al. | | 726/1 |
| 6,389,402 B1 * | 5/2002 | Ginter et al. | | 705/51 |

(Continued)

OTHER PUBLICATIONS

Orr, Bill "Uncle Sam goes digital" Jul. 1997ABA Banking Journal v89n7 pp. 62-68+.*

(Continued)

*Primary Examiner* — Kelly Campen  
(74) *Attorney, Agent, or Firm* — Hunton & Williams, LLP

(57) ABSTRACT

A system and method for verifying, authenticating, and providing notification of a transaction, such as a commercial or financial transaction, with and/or to at least one party identified as engaging in the transaction and/or identified as having a potential interest in the transaction. A central system accepts information regarding a transaction, including information about at least one party identified as engaging in the transaction, such as by a credit account number or Social Security number or merchant account number, and/or identified as having a potential interest in the transaction. Based on the information regarding the transaction and any supplemental information the central system determines, the central system communicates with and/or to at least one party and/or additional or alternative parties, via at least one communications device or system having a communications address, such as a telephone number or Short Message Service address, predetermined as belonging to the at least one party and/or additional or alternative parties. Via said communications, at least one party identified as engaging in, or having an interest or a potential interest in, the transaction may be notified of it, and may further be enabled or required to supply additional verifying or authenticating information to the central system.

63 Claims, 32 Drawing Sheets

U.S. PATENT DOCUMENTS

| | | | | |
|---|---|---|---|---|
| 6,427,140 B1 * | 7/2002 | Ginter et al. | | 705/80 |
| 7,069,249 B2 * | 6/2006 | Stolfo et al. | | 705/74 |
| 7,127,427 B1 * | 10/2006 | Casper | | 705/44 |
| 7,536,360 B2 * | 5/2009 | Stolfo et al. | | 705/68 |
| 2002/0002545 A1 * | 1/2002 | Resneck | | 705/74 |
| 2002/0152179 A1 * | 10/2002 | Racov | | 705/67 |
| 2004/0002903 A1 * | 1/2004 | Stolfo et al. | | 705/26 |
| 2006/0247982 A1 * | 11/2006 | Stolfo et al. | | 705/26 |
| 2007/0005445 A1 * | 1/2007 | Casper | | 705/26 |

OTHER PUBLICATIONS

Borg, Kim "U.S. champions free trade—except for encryption technologies" Aug. 1997 Computer Technology Review v17n8 pp. 1, 6+.*

Salkin, Steve "Fear of buying" May 1999 Logistics Management & Distribution Report v38n5 pp. 101.*

* cited by examiner

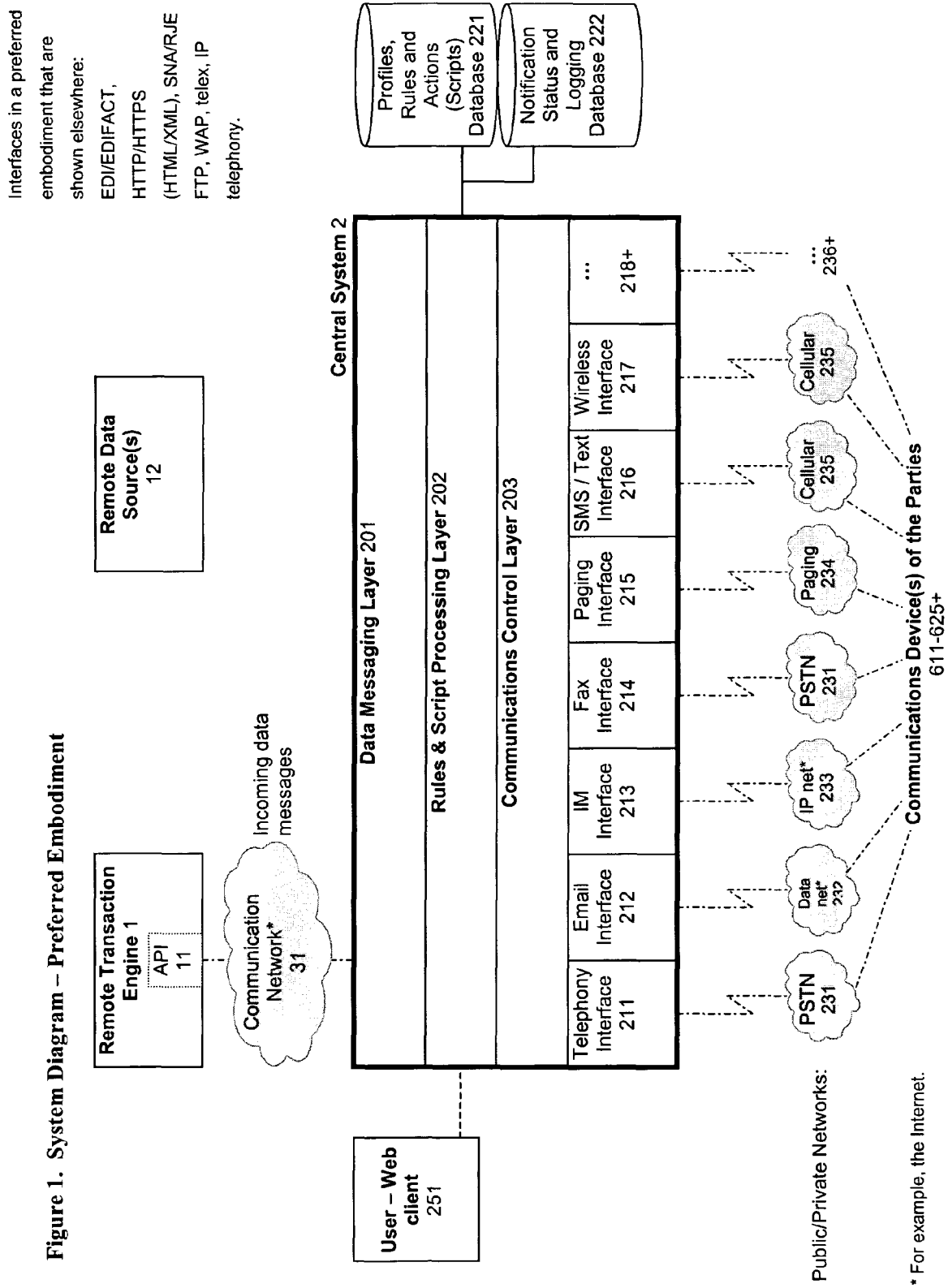
Figure 1. System Diagram – Preferred Embodiment

Figure 2. Application Programming Interface Generalized Schema

Message session establishment / message headers
- RTE ID [21a]
- RTE authentication information (digital certificate, PKI data, password, etc.) [21b]

| Required Field Values | |
|---|---|
| Party 1 ID [22a] | Party 1 ID Type [22b] |
| Transaction Type [22c] | Transaction Amount [22d] |

| Optional Field Values | | | | |
|---|---|---|---|---|
| Party 1 Role [23] | | Party 1 Confirm Value (encrypted) [23a] | | Party 1 CV Type [23b] |
| Party 2 ID | Party 2 ID type | Party 2 Role | Party 2 CV | Party 2 CV Type |
| ... | | | | |
| Party N ID | Party N ID type | Party N Role | Party N CV | Party N CV Type |
| Party 1 Comm. Addr. #1 [23c] | | Party 1 Media Type #1 [23d] | | Party 1 Addr. #1 Reference [23e] |
| Party 1 Comm. Addr. #2 | | Party 1 Media Type #2 | | Party 1 Addr. #2 Reference |
| ... | | | | |
| Party 1 Comm. Addr. #M | | Party 1 Media Type #M | | Party 1 Addr. #M Reference |
| Party 2 Comm. Addr. #1 [23f] | | Party 2 Media Type #1 | | Party 2 Addr. #1 Reference |
| ... | | | | |
| Party N Comm. Addr. #M | | Party N MediaType #M | | Party N Addr. #M Reference |

| |
|---|
| Group ID of a Collection of Parties [23f] |
| Transaction Currency [23g] |
| Transaction Language [23h] |
| Rule Set ID [23i] |
| General Interactive Message Template ID [23j] |
| General Interactive Message Template or Stylesheet URL [23k] |
| Party 1 Interactive Message Template ID [23l] |
| ... |
| Party N Interactive Message Template ID |
| User-defined Tracking and Billing Codes [23m] |
| Logging Level (numeric) [23n] |
| User-defined Message Template String [23o] |
| User-defined Transaction Detail Pairs #1-Q [23p] |
| Party 1-N Demographic Data [23q] |

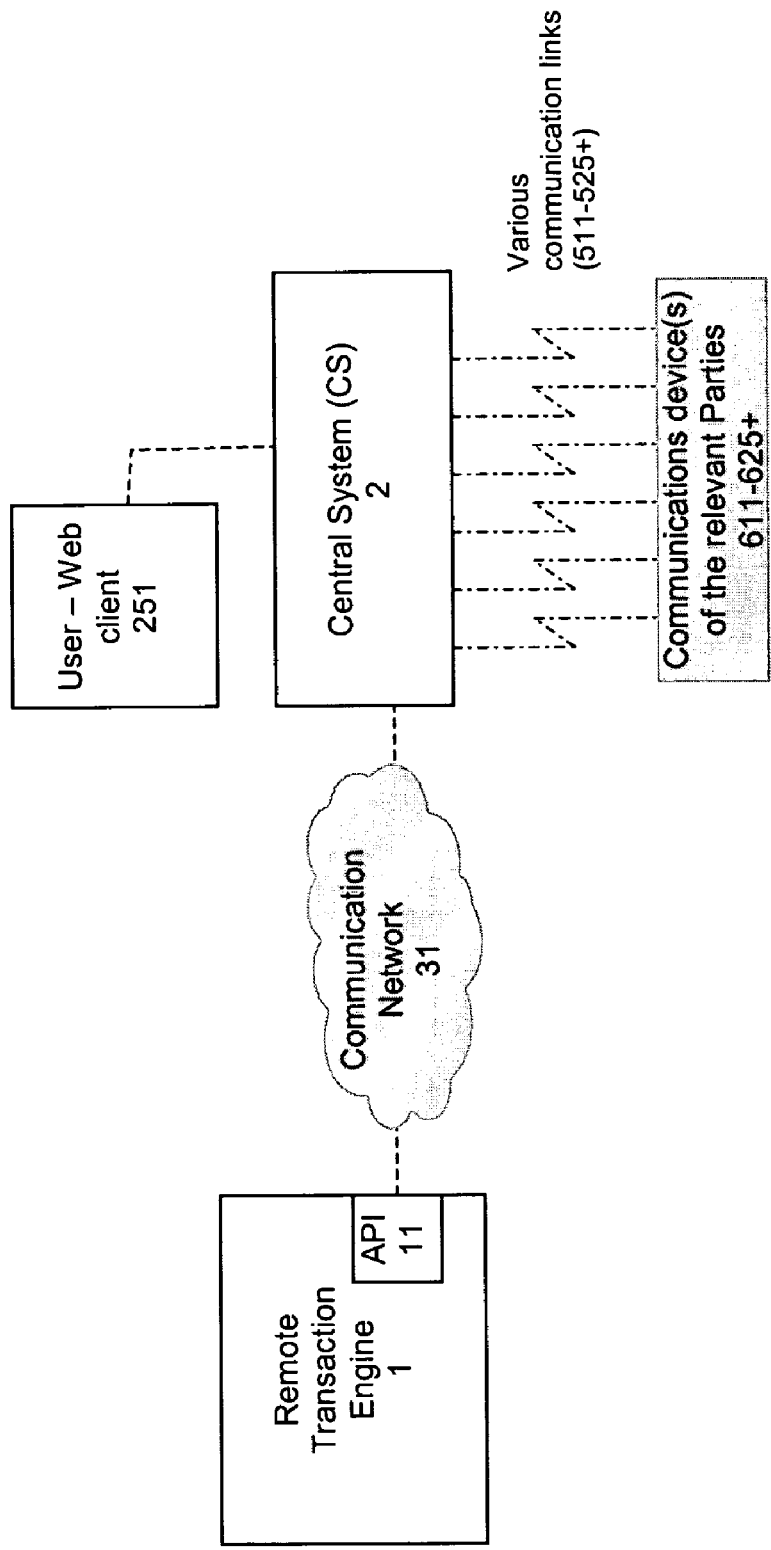
Figure 3. Networking Configuration

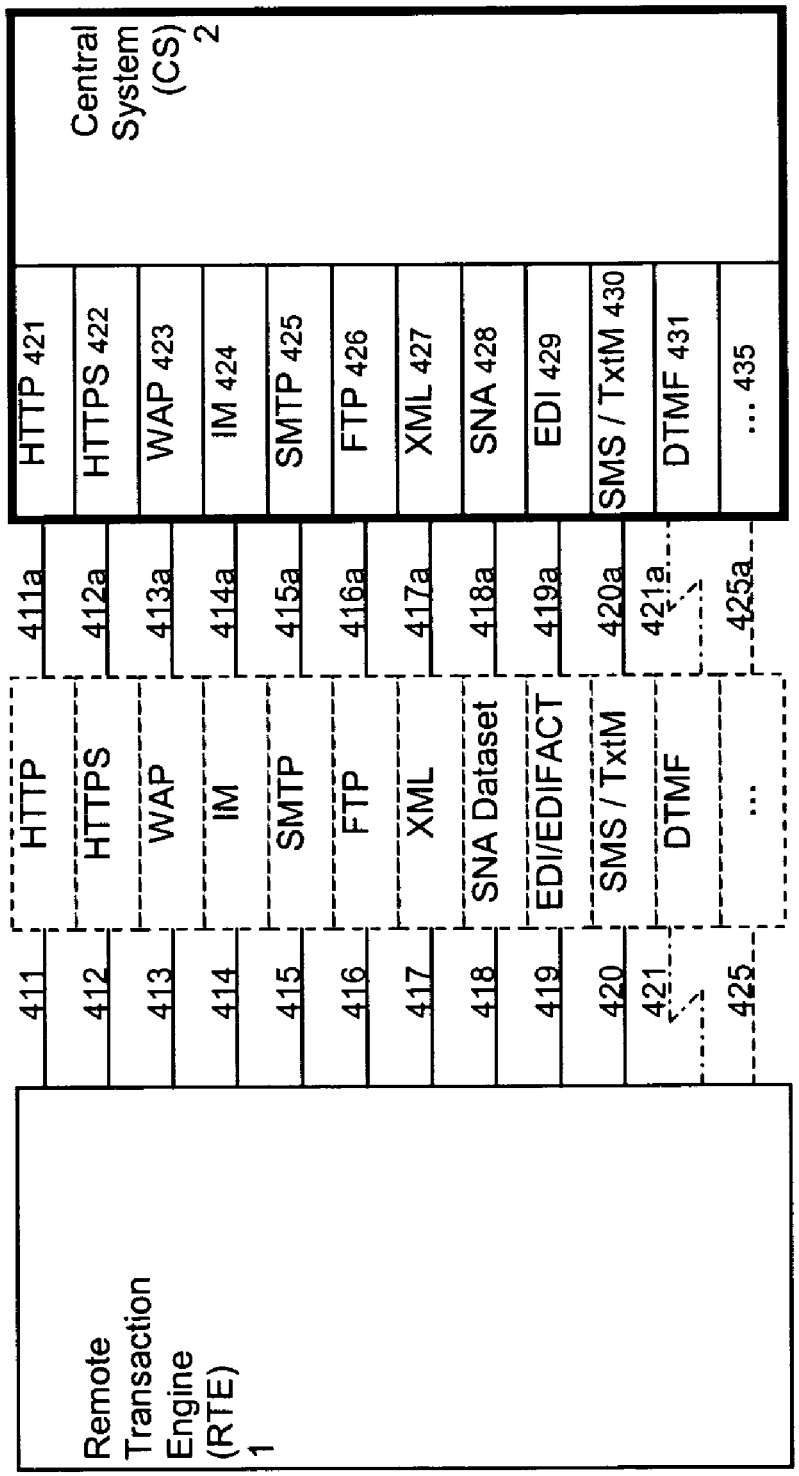
Figure 4. Remote Transaction Engine Communications Interfaces – Data Messaging Layer Figure 5. Rules Database View

| Rule Set ID* 5a | Message Template ID 5b | Message Template Stylesheet URL 5c | Transaction Language 5d | Transaction Currency 5e | Confirmation Value Type 5f | External Media Address Reference Flag 5g | Allowed Media 5h | Script ID 5i | Default Comm. Sequence Pattern ID 5j |
|---|---|---|---|---|---|---|---|---|---|
| ... | ... | ... | ... | ... | ... | ... | ... | ... | ... |

*Index Key

Figure 6. Profiles Database Views

Database View: <u>Parties</u>

| Party ID* 6a | Transaction Type* 6b | Party Account* 6c | Party Group ID 6d | Rule Set ID 6e | Demographic Information 6f | Transaction Language 6g | Confirmation Value (CV) Type 6h |
|---|---|---|---|---|---|---|---|
| ... | ... | ... | ... | ... | ... | ... | ... |

Database View: <u>Profiles</u>

| Party ID* 6a | Transaction Type* 6b | Party Account* 6c | Comm. Address* 6i | Media Type 6j | Party Role 6k | Comm. Sequence Group 6L (number) | Comm. Priority 6m (number) | Comm. Sequence Pattern ID 6n | Confirmation Value (CV) 6o |
|---|---|---|---|---|---|---|---|---|---|
| A | ... | 123 | A1 | Tel | Confirm | ... | ... | ... | ... |
| A | ... | 123 | A2 | Cel | Confirm | ... | ... | ... | ... |
| B | ... | 456 | B1 | E-mail | Notify | ... | ... | ... | ... |
| C | ... | 789 | ... | ... | Present | ... | ... | ... | ... |
| ... | ... | ... | ... | ... | ... | ... | ... | ... | ... |

*Index Keys

Figure 7. Party-Transaction Group Profiles Database View

Database View: Groups

| RTE ID* 7a | Party Group ID* 7b | Party ID* 7c | Transaction Type* 7d | Party Role 7e |
|---|---|---|---|---|
| | ... | ... | ... | ... |

*Index Keys

Figure 8. Communications Sequence Patterns Database View

| Comm. Sequence Pattern ID* 8a | Interactivity Flag 8b (Boolean) | Outbound / Inbound 8c | Attempt Timeout Value 8d (seconds) | Sequence Timeout Value 8e (seconds) | First Attempt Delay 8f (seconds) | Smart Retry Flag 8g (Boolean) | Max. # Attempts 8h (numeric) | Attempts Spacing 8i | Action on Final Failure 8j | Generate Event on Connection Flag 8k (Boolean) |
|---|---|---|---|---|---|---|---|---|---|---|
| ... | ... | ... | ... | ... | ... | ... | ... | ... | ... | ... |

*Index Key

Figure 9. Scripts Database View

| Script ID* 9a | Stored Script Code 9b |
|---|---|
| ... | ... |

*Index Key

Information on Script statements, script objects, *etc.* is found in Figure 26.

Figure 10. Message Templates Database View

| Message Template ID* 10a | Language* 10b | Stored Message Template 10c |
|---|---|---|
| ... | ... | ... |

*Index Key

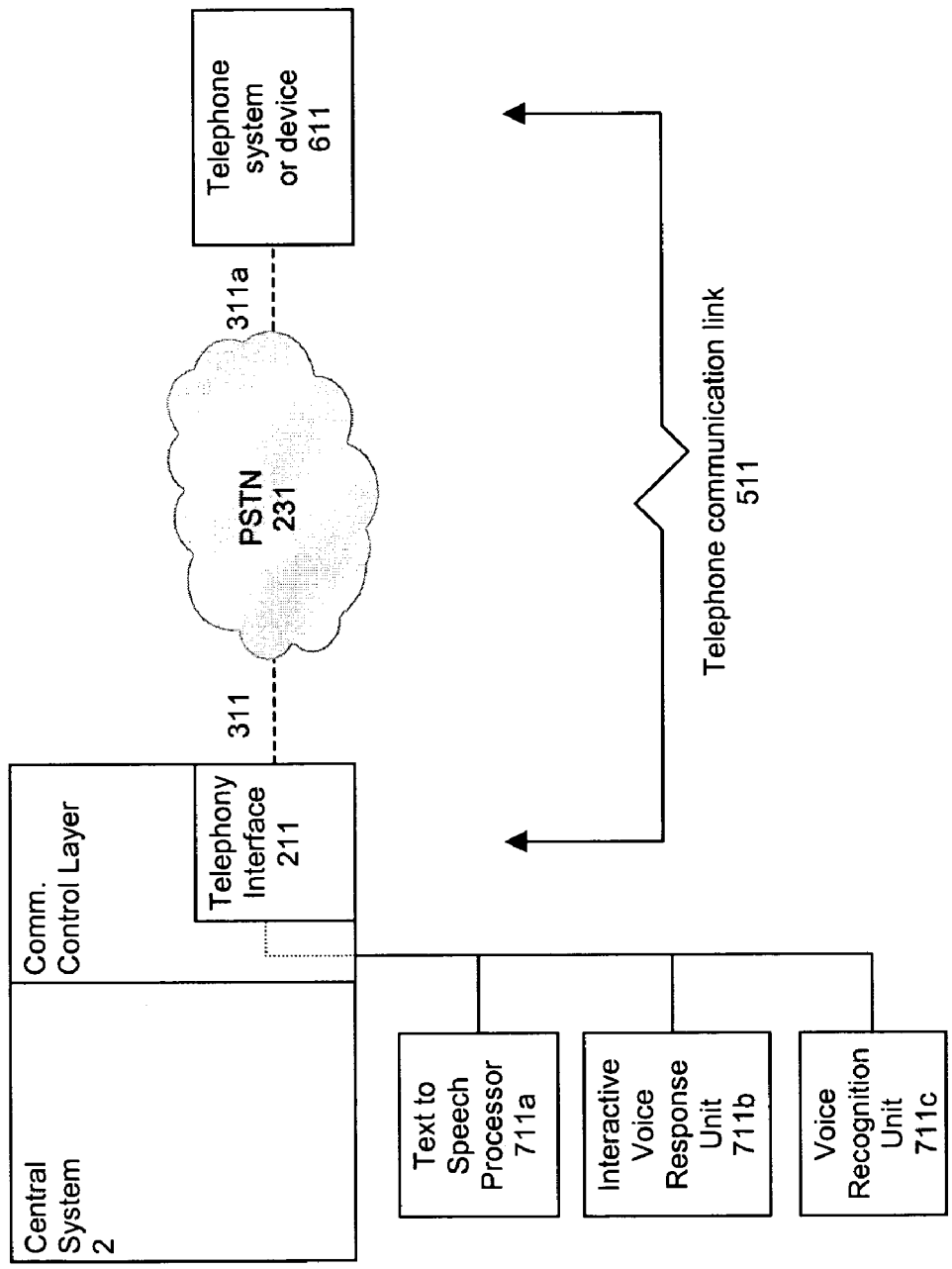
Figure 11. Communications Subsystems: Telephony

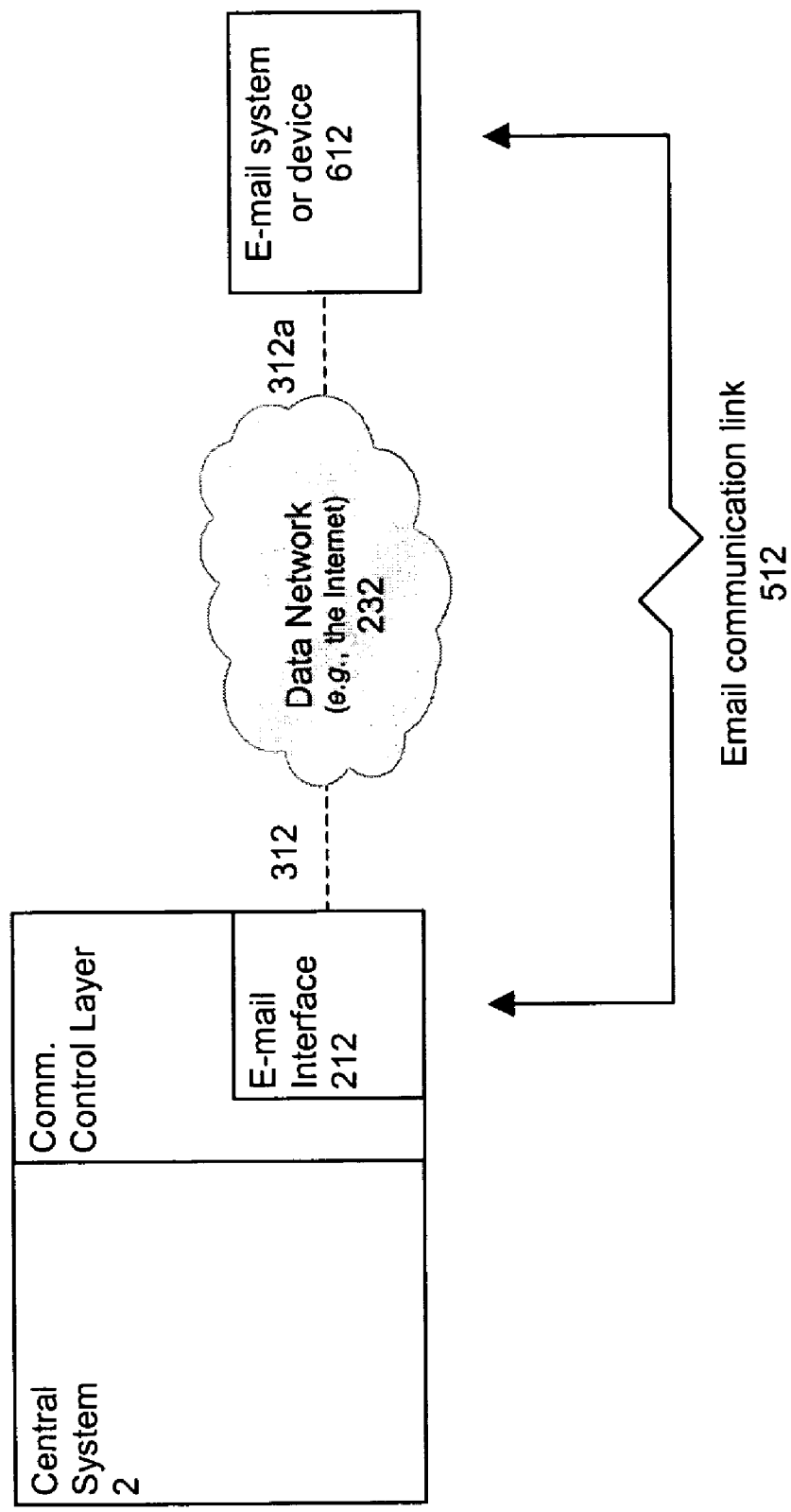
Figure 12. Communications Subsystems: E-mail

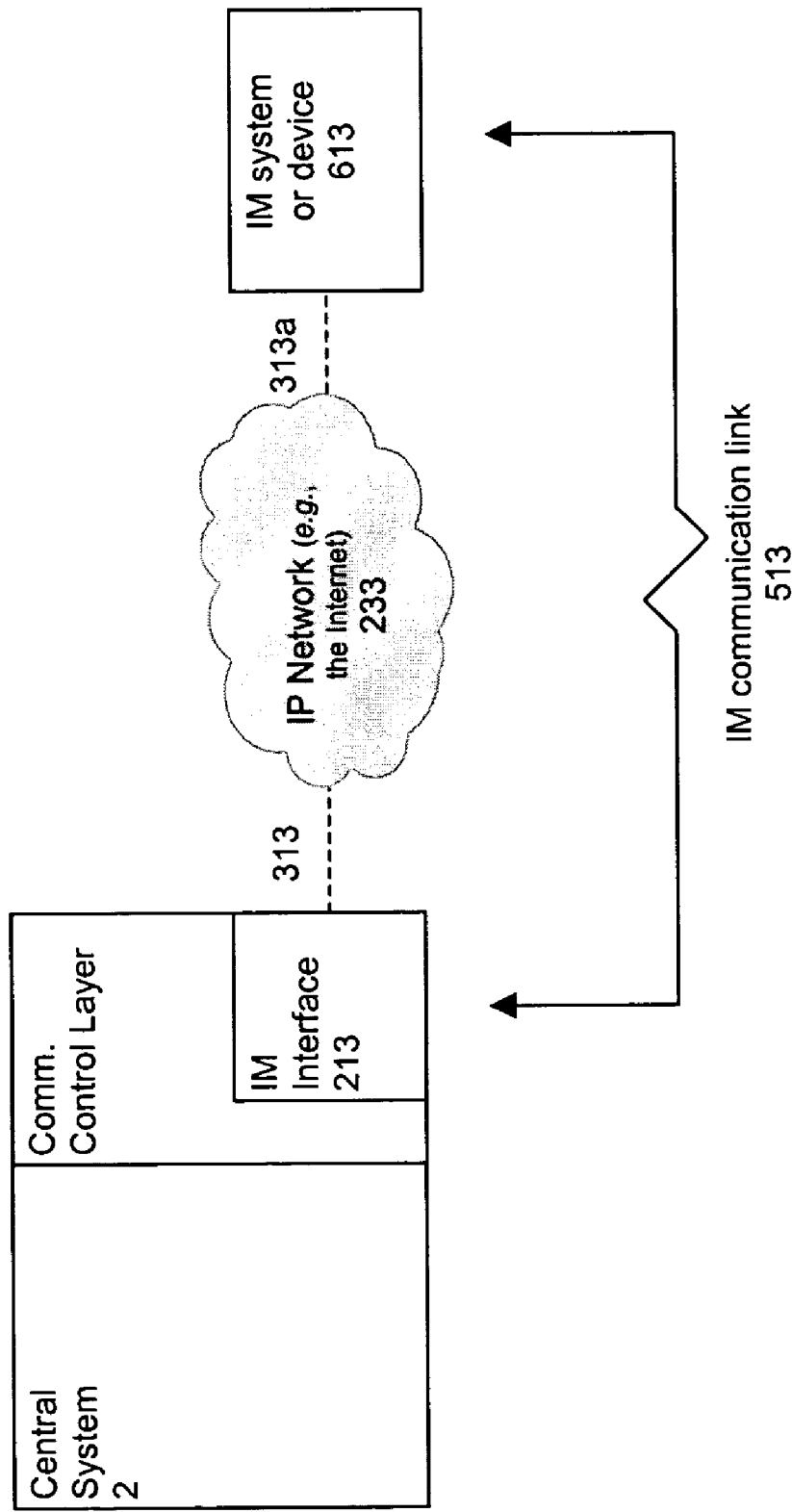
Figure 13. Communications Subsystems: Instant Messaging

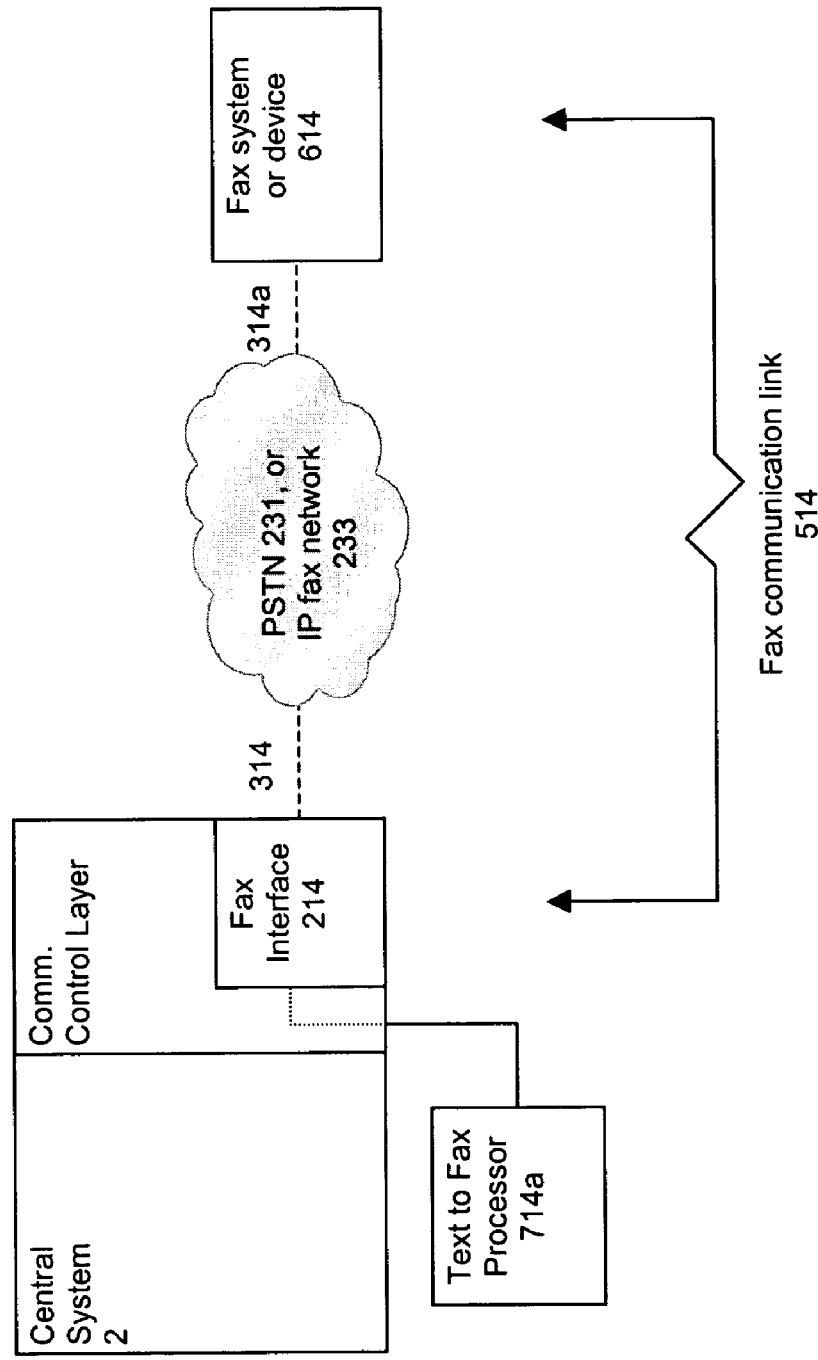
Figure 14. Communications Subsystems: Fax

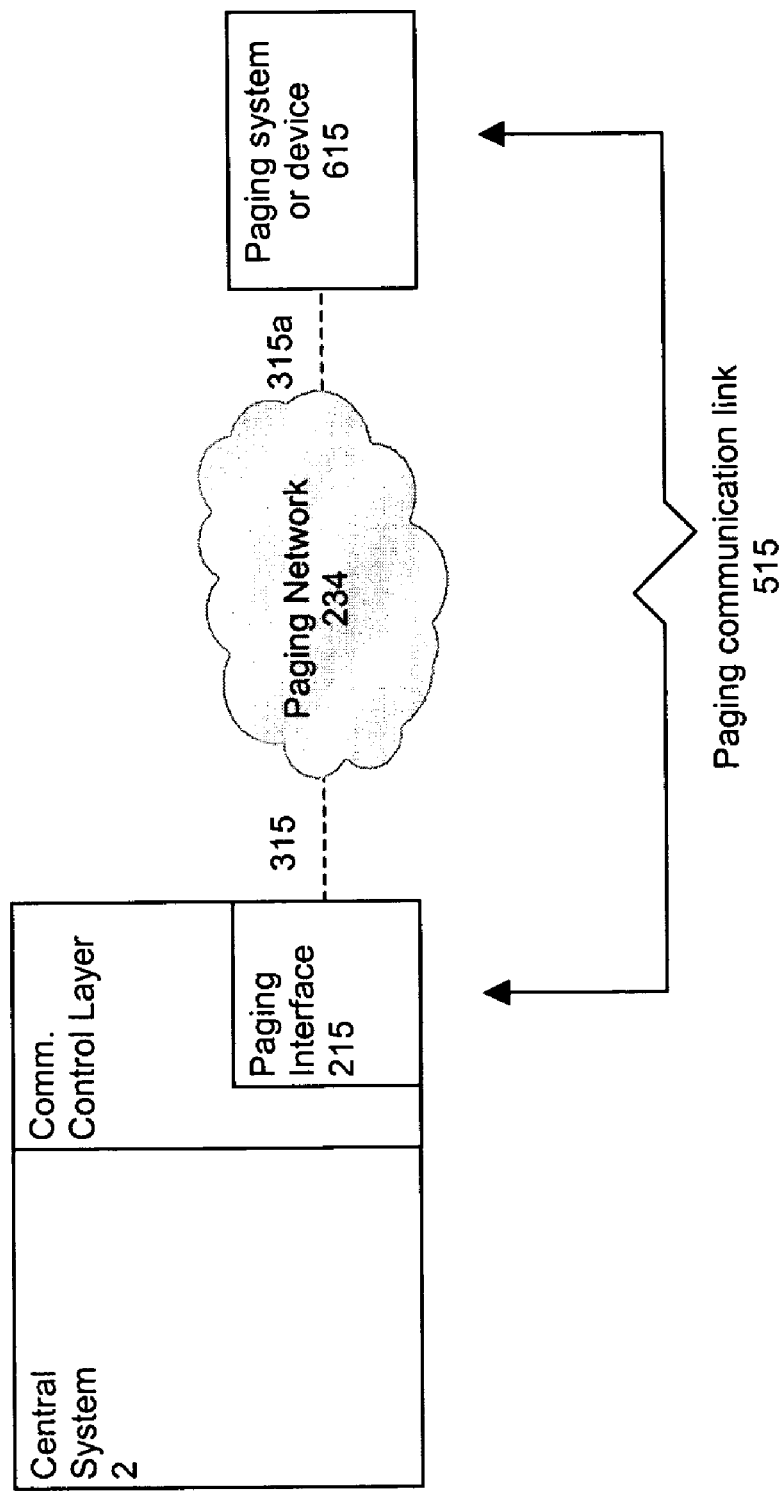
Figure 15. Communications Subsystems: Paging

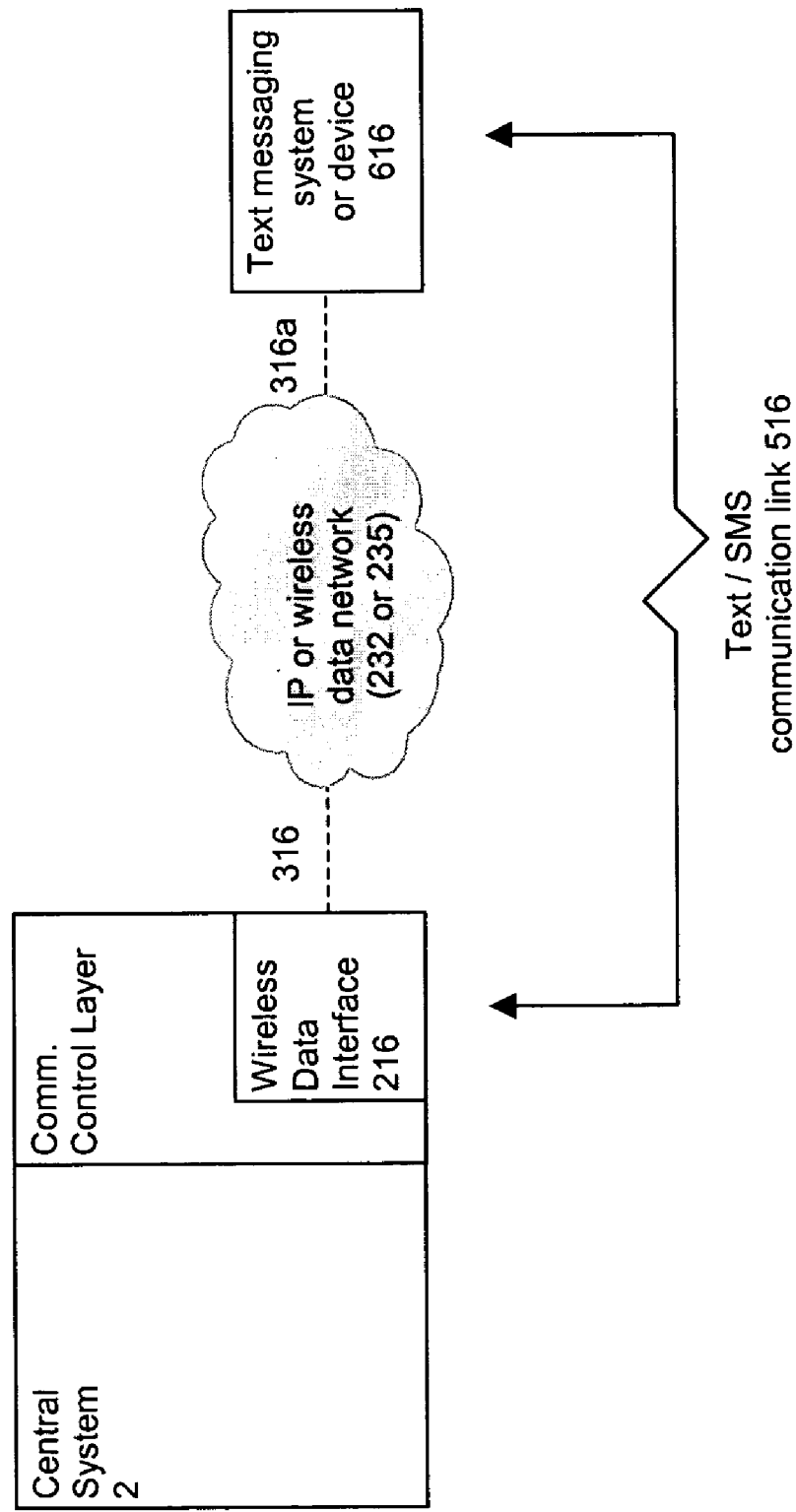
Figure 16. Communications Subsystems: Wireless Text Messaging / Short Message Service

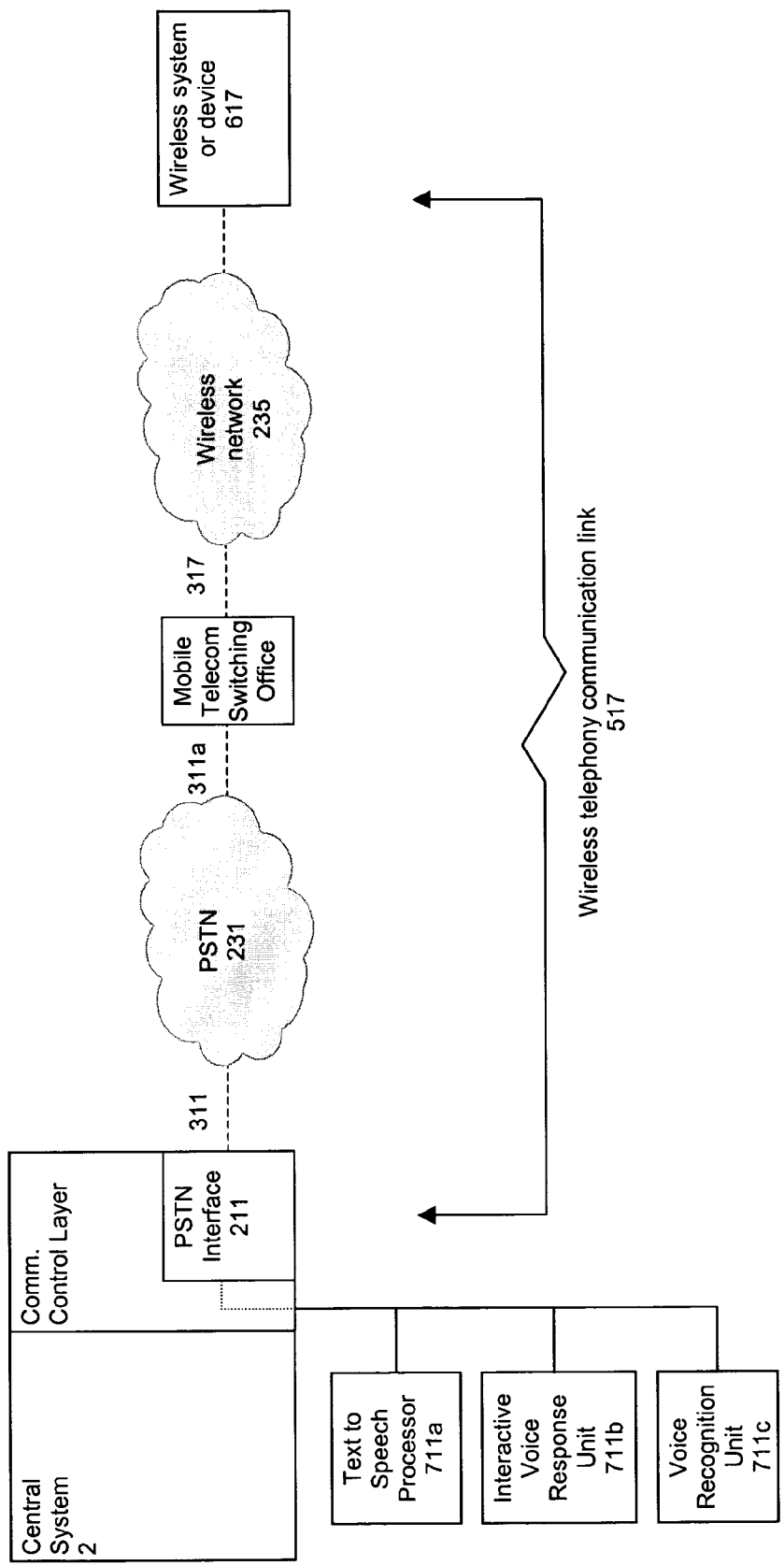
Figure 17. Communications Subsystems: Wireless Telephony

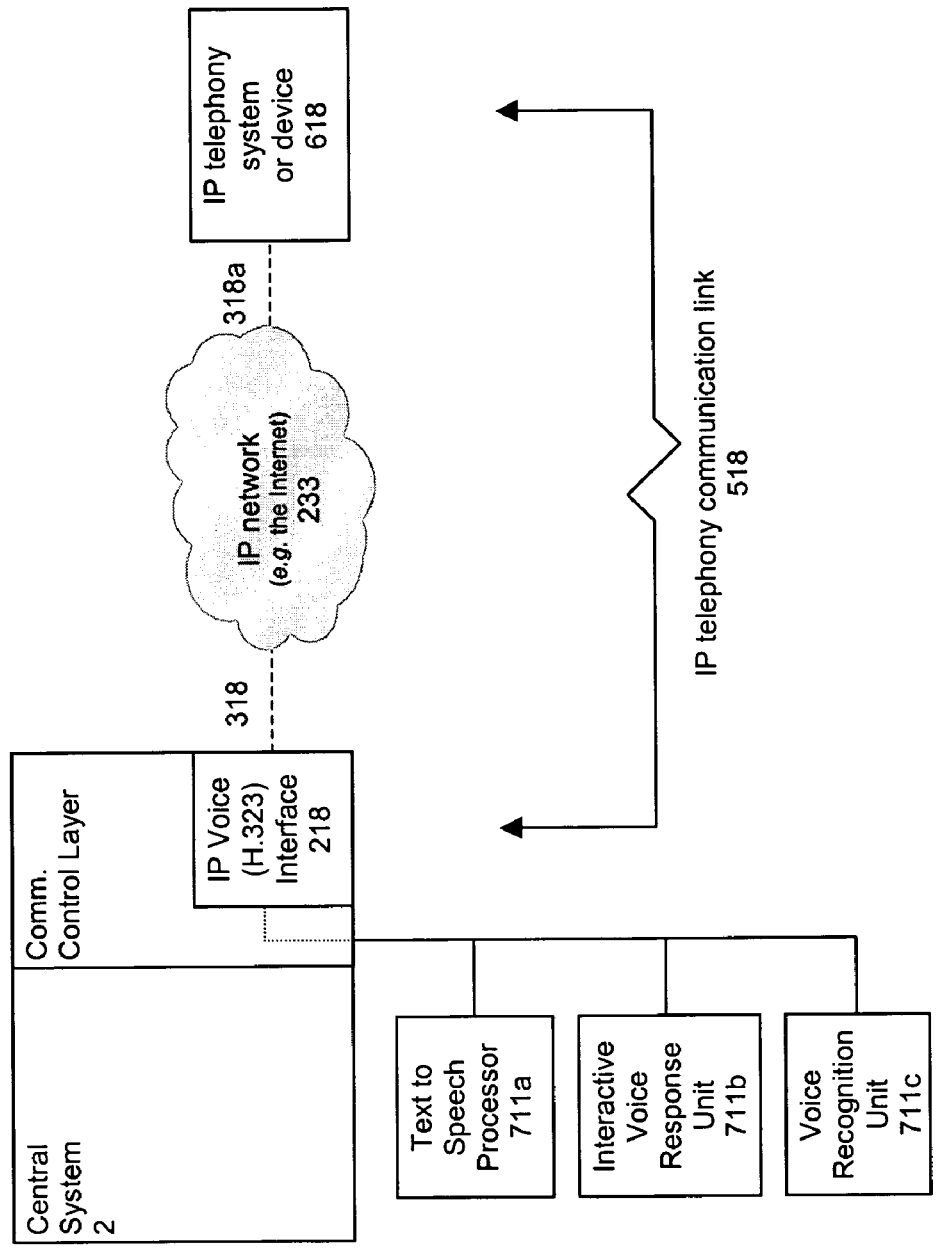
Figure 18. Communications Subsystems: IP Telephony

Figure 19. Communications Subsystems: Internet Data Protocols – HTTP / HTTPS using HTML / XML
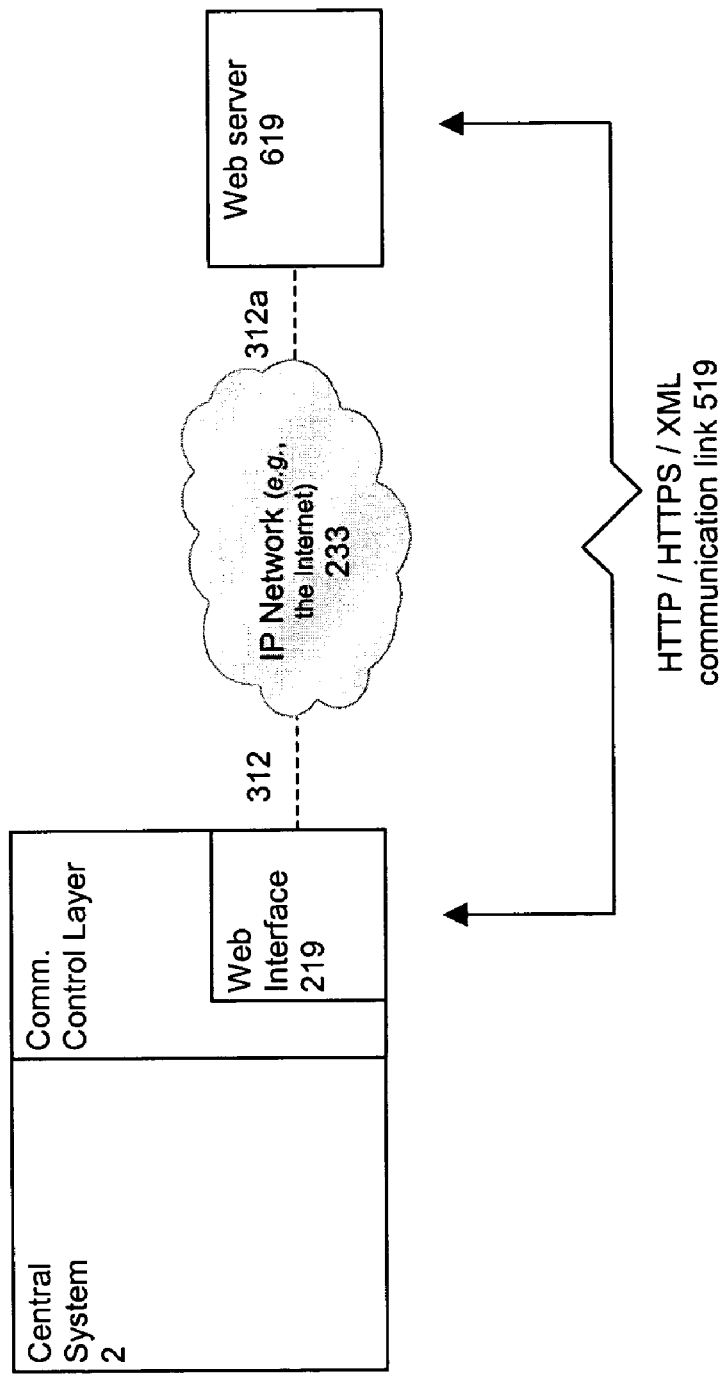

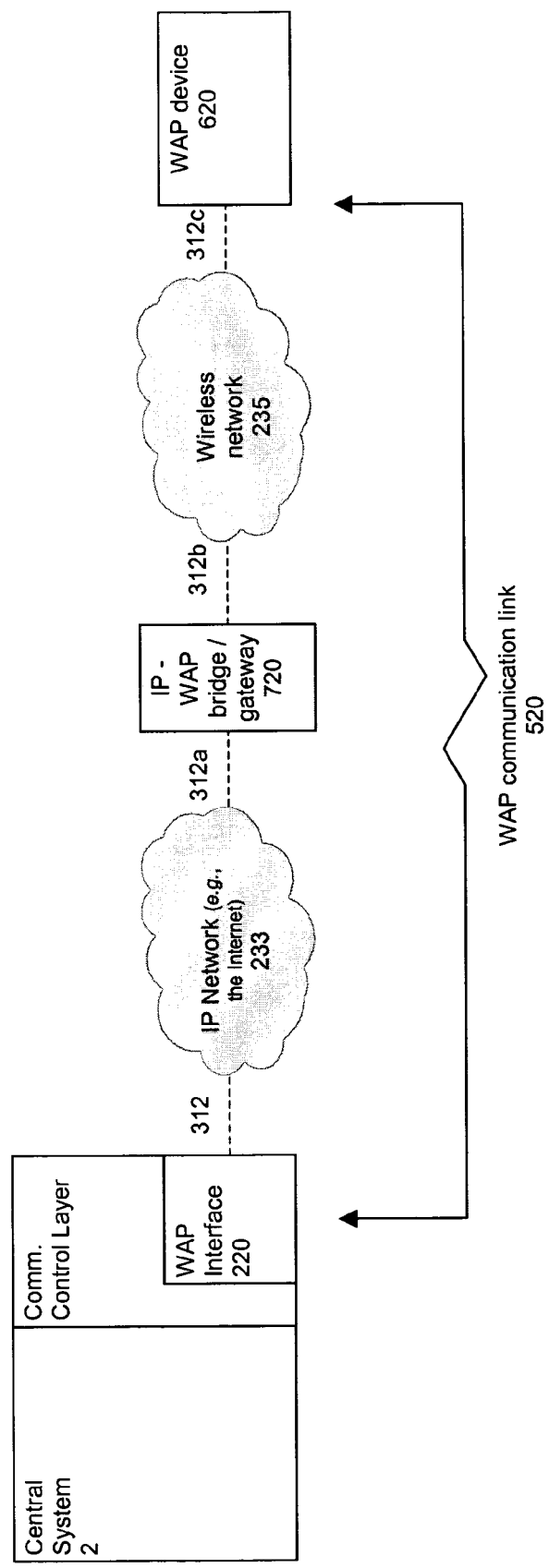
Figure 20. Communications Subsystems: WAP

Figure 21. Communications Subsystems: Telex
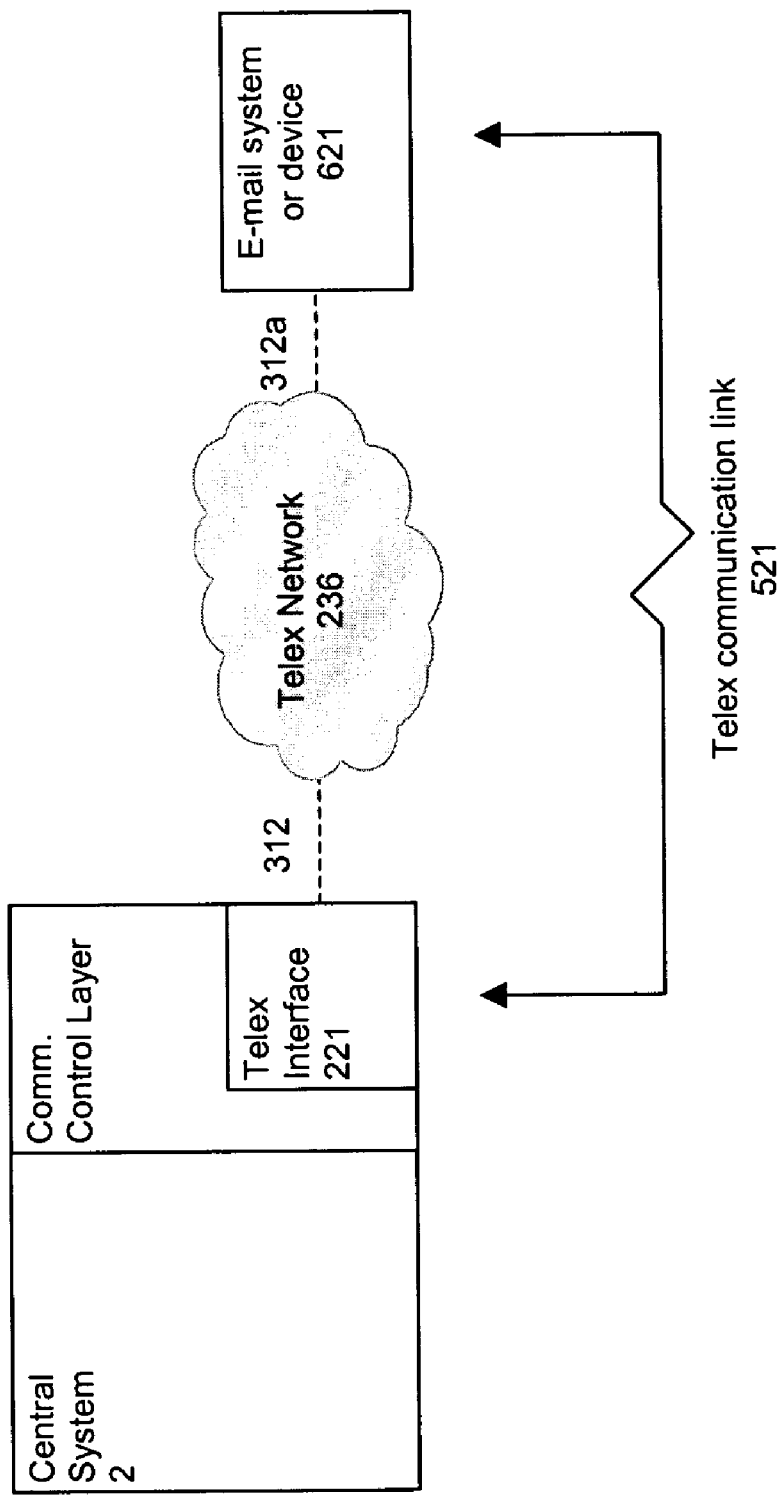

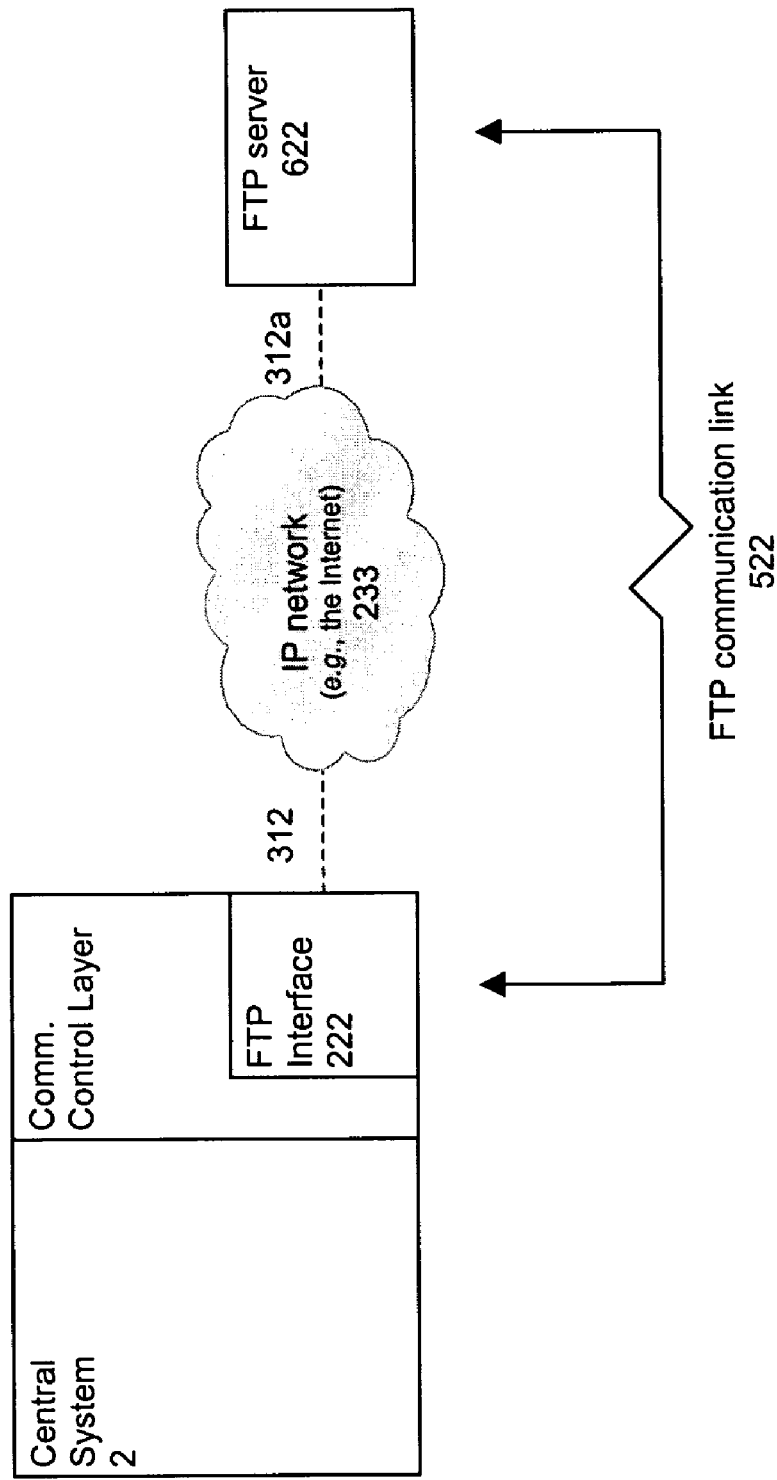
Figure 22. Communications Subsystems: FTP

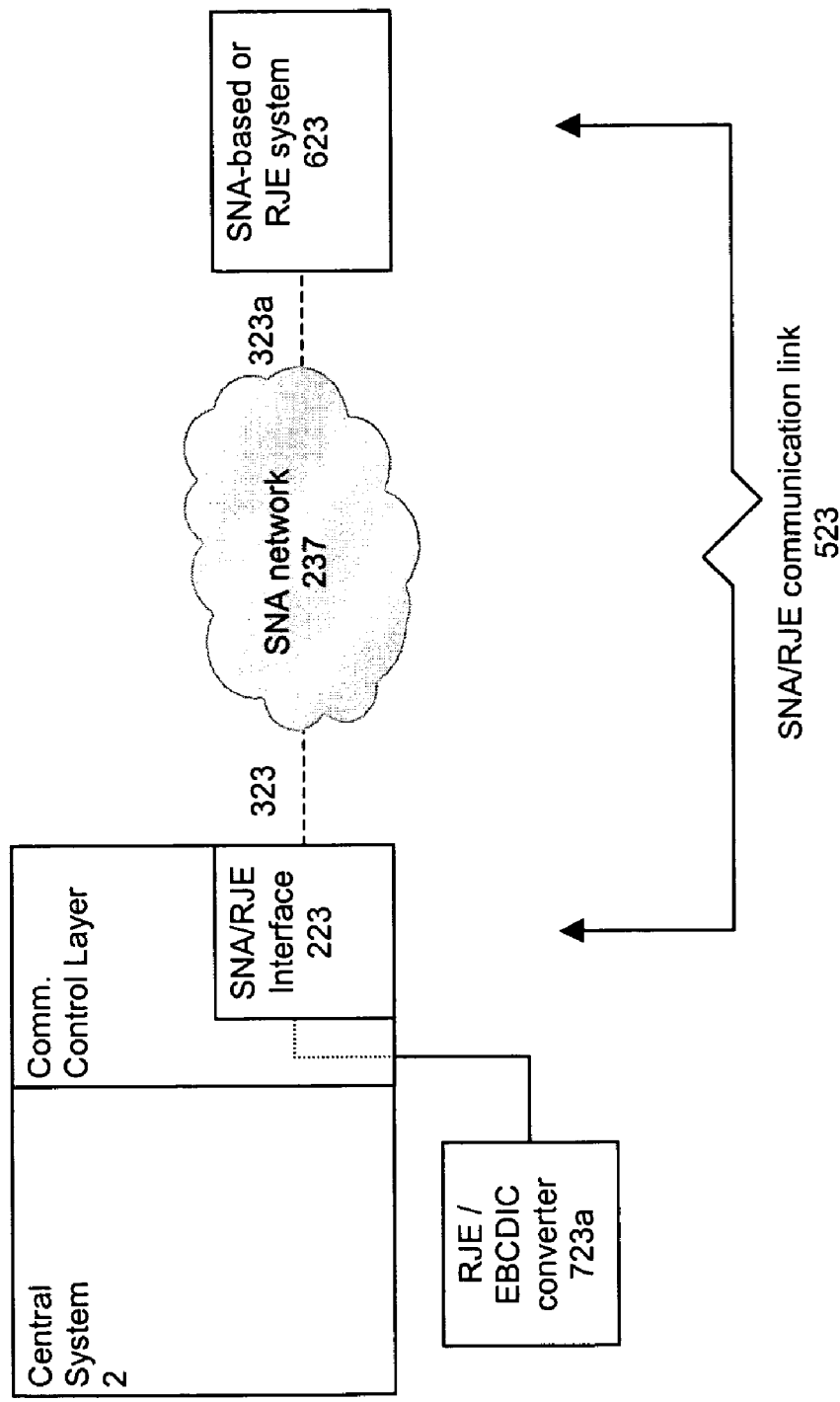
Figure 23. Communications Subsystems: SNA/RJE Datasets

Figure 24. Communications Subsystems: EDI / EDIFACT / EDI-INT
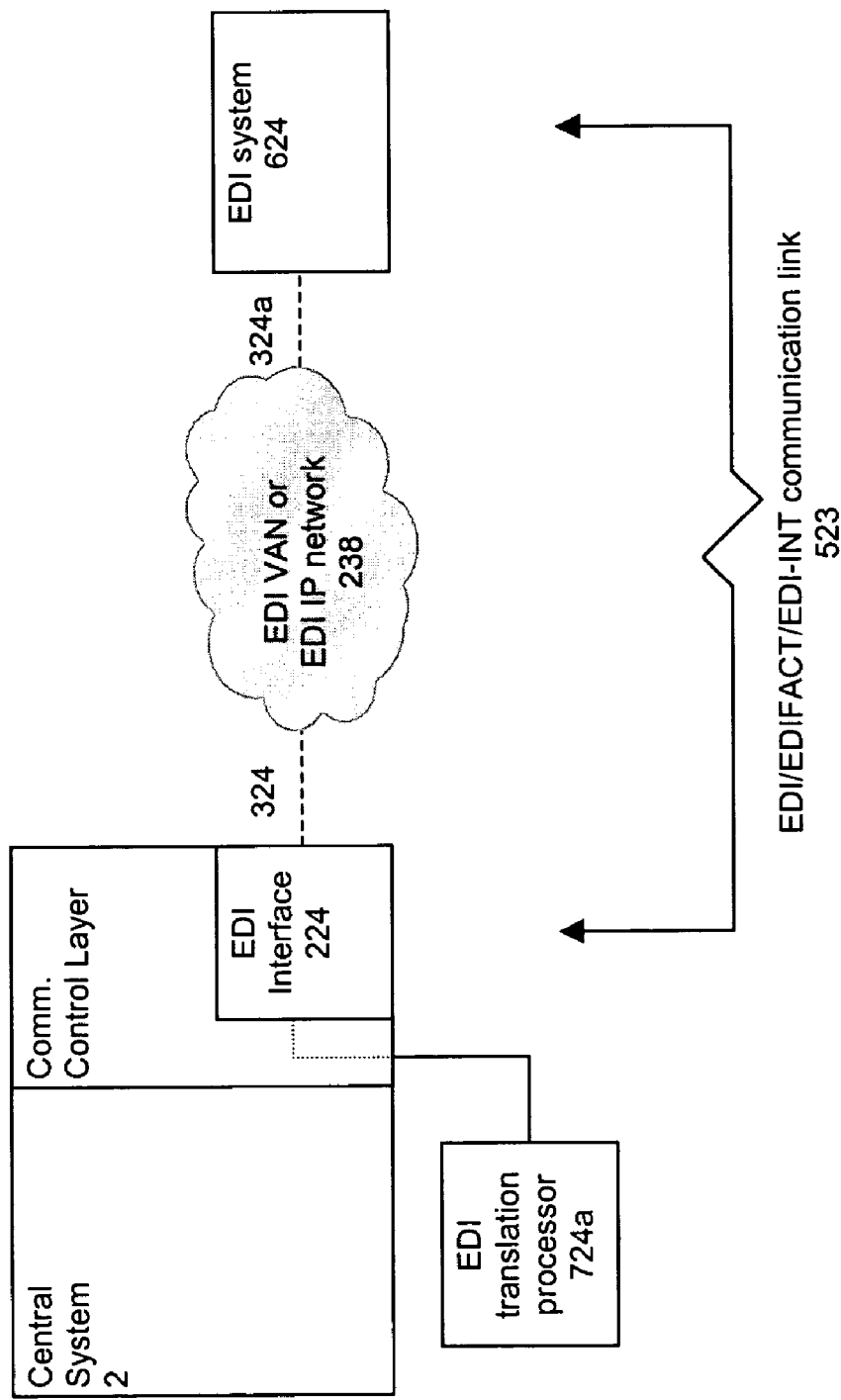

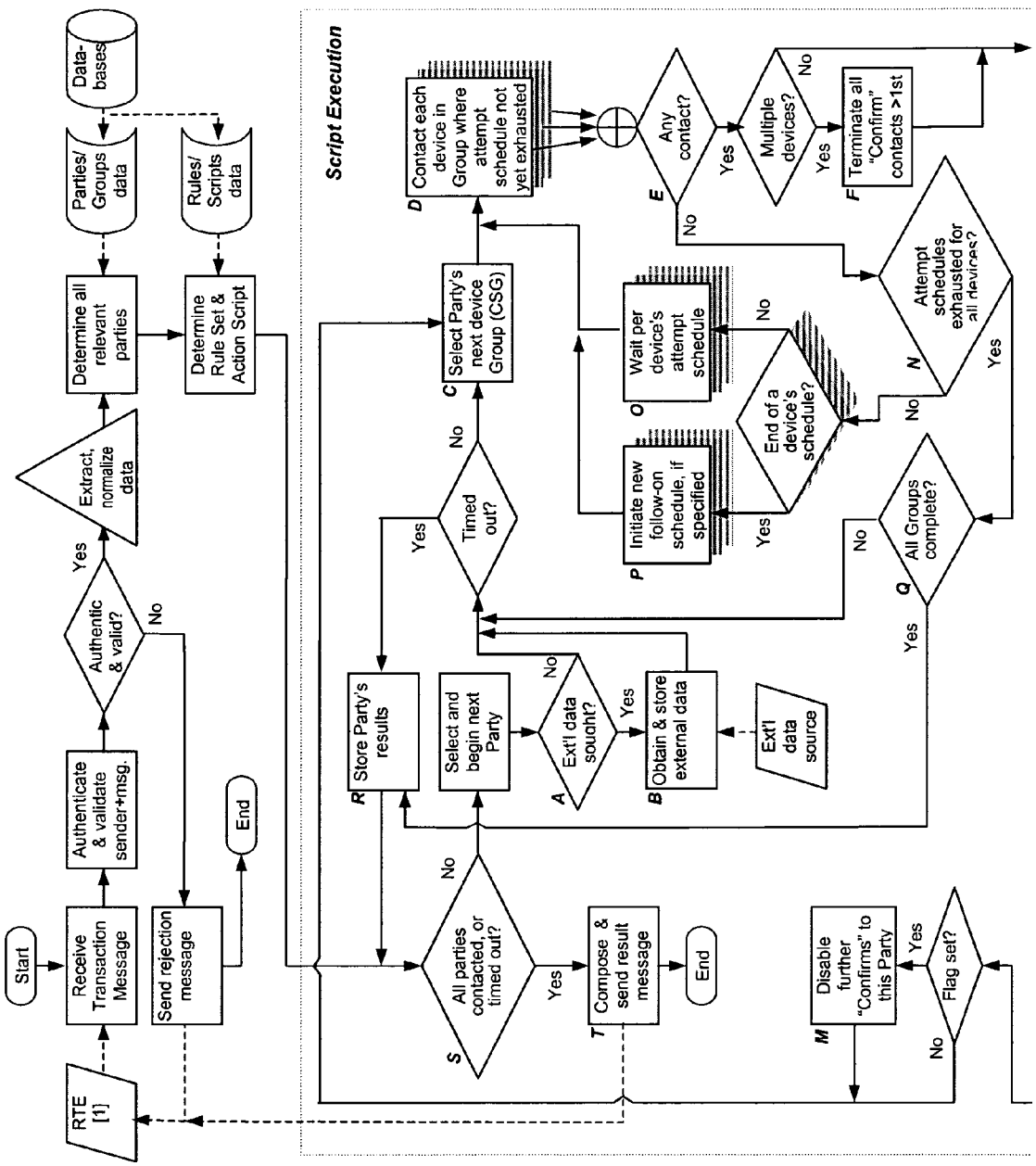
Figure 25. Generalized Process Diagram

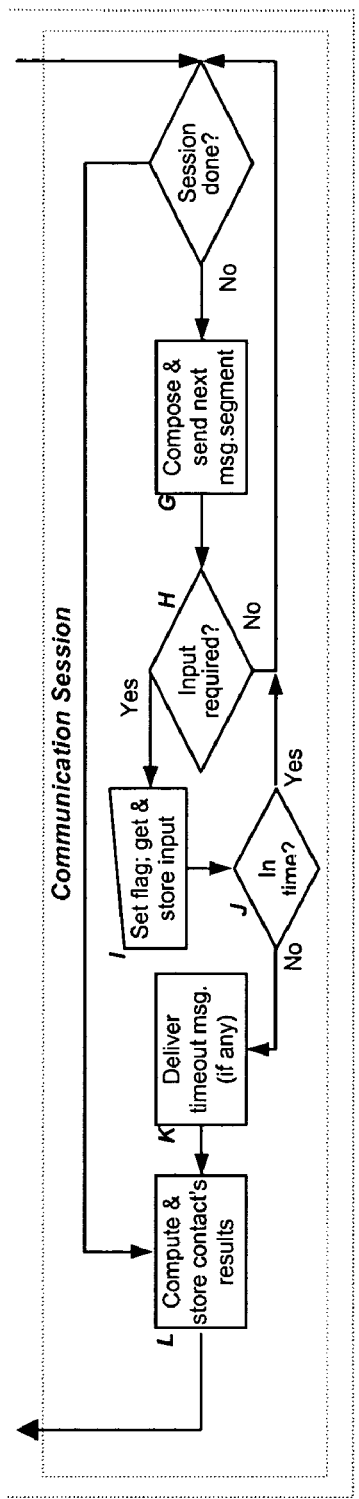
Figure 25. Generalized Process Diagram, continued

Figure 26. Communication Scripting Language Statements, Object Methods, Properties, and Environment Variables

Script Statements and Object Methods

Scripts reference Transaction Objects and, within them, communication session Objects, and where noted, the functions described herein exist as executable methods of those Objects. Here follows a list of fundamental methods and statements.

```
Message ComposeMessage( Message template string, Media type )

Returns deliverable message content based on a textual
     template with embedded value substitution and file insertion,
     in a format appropriate to the designated media type Message MessageCat( Message1, Message2 )

Returns the concatenation of the content of two messages.

Variant InitiateCommSession( Communications address, Media type )

[Object method.]  Returns a result code based on the success
     or failure of establishing a communications session (such as a
     telephone call, Instant Messaging session, etc.) to a
     specified communication address using the specified medium.
     The result for success is a session ID for the communication
     session.  The result code for failure indicates the nature of
     the failure (e.g., for a telephone call, result code represent
     answered, busy, fast-busy, timeout on ring without answer, no
     ring, etc.)

Variant AwaitCommSession( Communications address, Media type,
Timeout )

[Object method.]  Establishes a system process which awaits
     for an incoming communication from the specified communication
     address on the specified medium.  If the session occurs within
     the Timeout interval, returns the session ID; if not, returns
     zero or null.
```

Figure 26 continued

```
Variant Input( Prompt, (int)Tries, (long)Timeout, (Bool)Complete,
Media type[,(string)Validation] )
```

> [Object method.] Returns input from a party via a
> communication session already in effect. If the session ended
> prematurely, returns null, if timed out, returns the empty
> value, otherwise returns the information provided by the user
> as alphanumeric text (or numeric text where appropriate). The
> Prompt is delivered within the session using ComposeMessage()
> to convert it to the appropriate medium. If Complete is True,
> the prompt is delivered to its completion regardless of the
> action of the party. If False, then, in a voice-based
> communication only, if the party begins to respond prior to
> the completion of the prompt message, the prompt message is
> cut short as of the moment the party begins to respond. The
> Validation string is used to verify acceptable values are
> received; if not, the prompt is repeated until they are, up to
> Tries times. The Timeout value applies per try.

```
Variant Output( Message, Media type )
```

> [Object method.] Delivers a preformatted message to the
> object communication session, as appropriate to the specified
> medium. For example, delivers an audio and text-to-speech
> message to a telephone, or a text message to a wireless text
> device. Returns a result code indicating success or failure.
> Note that some media, such as electronic mail, do not provide
> a means for timely determination of success and failure of an
> output transmission.

```
Variant EndCommSession( )
```

> [Object method.] Terminates a communication session and frees
> the related communication subsystem resources. Returns a
> result code indicating success or failure, and if failure, the
> corresponding error reported by the communication subsystem.

```
Variant Wait( (long)Timeout[, (Bool)Interrupt] )
```

> [Object method.] Waits for a specified time in a
> communication session, or pauses script execution for a
> specified time if invoked as an objectless statement. If
> Interrupt is True, then the wait is ended prematurely when any
> input is generated on the remote end of the session (e.g., the
> party presses a key on his/her phone).

Figure 26 continued

```
Variant DLookup( (string)Fieldname, string(Tablename),
(string)Condition )

Returns first field value drawn from a known database table
    where the specified condition is met.  If none, returns null.

DateTime DateTimeStamp( [Timezone] )

Returns a date-time stamp value in GMT if no timezone is
    given, or else in the timezone specified.

If {expression} Then {statement(s)} [ Else {statements(s)}

Standard branching statement, typically used with a script's
    Environment Variables.

Select | Case {expression} {statement(s)} [ ... ] | Else
{statement(s)}

Standard control statement, typically used with a script's
    Environment Variables.

While {expression} Do | Loop | Break

Standard iteration control statements.

For Each {case of object} | Next | Break

Standard serial group-execution control statements.  For
    example, used to iterate through all the Communication
    Addresses [see Figure 6, field (6c)] for a given party to a
    transaction until a successful session is established.

Execute {shell command [ < Message | Environment Variables]}

Allows script to call processes and programs external to
    itself, passing messages and/or environment variables.
```

Figure 26 continued

Transaction and Communication Session Object Properties

Here follows a list of fundamental Transaction and communication session Object properties.

| | |
|---|---|
| Active: | True if the session to the target communication device is currently active. |
| Attempt: | If the session is being retried, the attempt number of the retry. |
| AttemptTime: | Elapsed time of the current attempt within the session. |
| CommAddress: | Address of the party for the communication session. |
| Inbound: | True if the session was initiated by the party, such as by calling into the central system. |
| Interactive: | True if the session supports receiving input from the contacted party. |
| MessageIn: | Most recent message (input) received, if any. |
| MessageOut: | Most recent message sent, if any. |
| Outbound: | True if the session was initiated by the system. |
| PortID: | ID number (system-generated) for the port in use for the session. |
| Reached: | True if the session successfully reached its target communication device. |
| SessionID: | ID number (system-generated) for the communication session. |
| SessionTime: | Elapsed time of the current session. |
| Status: | Status value describing the most recent event during the session; when the session is ended, describes the result (e.g., reached and confirmed, reached without confirmation, did not reach with error code describing why). |
| Timeout: | Current session timeout value, if any. |

Figure 26 continued

Script Environment Variables

Here follows a list of fundamental environment variables available to a script.

MessageTemplate[n]: Message template for each party, computed based on the Rule Set in effect for the transaction and any override values supplied by the RTE per Figure 2.

Parties: Count of the number of parties involved in a given transaction; the external source of information about the transaction (Remote Transaction Engine, or RTE [1]) is also counted. Note that the list of parties to a transaction may be augmented through reference to an internal Party Group for a given party and type of transaction [Figure 6, 6d; Figure 7, 7b].

PartyConfirmContact[n]:
If True, indicates that a particular party has been reached in a communication session in a "Confirm" role [Figure 6, 6k; Figure 7, 7e]. This value is typically set by the CCL [203] during Script execution, and then used to disable further attempts to contact the party on "Confirm" Role devices and media for the current transaction.

PartyCV[n]: The confirmation value required of a given party to additionally authenticate and verify the party's identity and intentions. This value is often a PIN, CVC2/CVV2/CID value, or other password defined by the party's financial institution, or by the merchant. The value is typically stored, but can be provided by the RTE as well as an optional incoming message parameter.

PartyCVType[n]: An identifier for the type of confirmation value sought or expected, such as PIN, CVC2, CVV2, CID, password, ZIP code, final 4 digits of Social Security Number, etc.

PartyID[n]: ID of a given party, from 1 to n, with party ID 0 being the ID of the RTE.

PartyIDType[n]: Type of ID of a given party. The Party ID Type defines whether the Party ID is an index value into the list of stored communication profiles, an account number (credit, debit, checking, etc.), a

Figure 26 continued known communications address (e-mail address, telephone number, etc.), and so on.

TrackingCode: RTE-supplied alphanumeric information describing the transaction, used for subsequent tracking and accounting/billing identification.

TransDescription: Textual descriptor of the transaction, supplied by the RTE.

TransDetails[a][0,1]: Additional information supplied by the message from the RTE, coded as user-defined value-pairs (see Figure 4, [23p]). (Such data would typically be encoded within the message using XML.) The [0] value holds the tag or name of the user-defined variable, the [1] value holds the variable's value.

TransID: Unique transaction ID supplied by the system for this transaction.

TransMessage: The entire incoming transaction message from the RTE.

Also included among the Environment Variables are those fields shown in Figure 2 not already listed above.

SYSTEM AND METHOD FOR VERIFICATION, AUTHENTICATION, AND NOTIFICATION OF A TRANSACTION

PARENT CASE TEXT

This application claims the benefit of U.S. Provisional No. 60/354,275 with filing date Feb. 4, 2002.

BACKGROUND OF THE INVENTION

1. Field of the Invention

The invention relates to fraud prevention and fraud "early warning" notifications for transactions, in particular remote and/or electronic transactions such as "e-commerce" and "m-commerce" transactions wherein it is desirable to authenticate and verify one or more parties' identities and intentions before the transaction is concluded and/or to notify one or more parties of the occurrence of the transaction.

2. Description of the Related Art

In a transaction in which security is a concern, such as an electronically conducted transaction involving a funds transfer or a purchase or payment, there are three basic questions which must be satisfied:
 1. Are the parties to the transaction who they say they are? (Do they own the goods, services, or funds or financial accounts that they represent they do?)
 2. Do they have the necessary authority or authorization to approve the transaction?
 3. Is the environment in which the transaction occurs secure? That is, can other parties gain access to the private information being exchanged during such a transaction?

Regarding question 1, the payments industry has devoted considerable attention to methods and systems designed to a) verify the identity of a purchaser, b) assess the risk of any given transaction, and c) take follow-on action in high-risk cases, either by subsequently inquiring of the payer whether the transaction was proper, or by denying funds or credit at the time of the transaction subject to later manual contact with the payer.

For more complex or higher-value transactions, per question 2 a buyer may be subject to a set of audit and control procedures designed to limit his/her purchasing authority. In most consumer purchasing cases, the buyer and authority-holder are usually the same person. In many organizational purchasing situations, the buyer(s) and authority-holder(s) are not the same. The payments industry has one primary tool for limiting purchasing authority, which is the spending limit or credit limit associated with the buyer's account. Attempted solutions to question 1 also help address question 2, since verifying identity helps address cases wherein a buyer is suborning the purchasing authority of another party by use of a stolen credit card number or other private information.

As regards question 3, the most relatively secure environment for purchase transactions remains a merchant's store, in which a buyer and seller can interact face to face, multiple forms of identification can be reviewed, and the opportunities for theft of private information are generally limited. At the other extreme are telephone, mail, and electronic commerce, in which the buyer is represented merely by his/her account information as supplied by phone, on a mailed form, or by data entry via a computer or other electronic device. Here, the opportunities for fraud and the theft of private information are relatively high. Further, there is a prevailing public perception that electronic purchasing environments (for example, virtual storefronts or Internet auctions) are inherently insecure in regard to the transmission and/or storage of private information.

The above factors are reflected in the relative "discount rate" (price) charged to merchants by credit card processors for in-store transactions vs. "card not present" transactions, for example. Typically, merchants pay 60% more per sales dollar in a "card not present" transaction than when a credit card is physically presented for swiping.

These differences in risk also apply when accounts themselves are opened, closed, and modified remotely, as via mail, telephone, wire, or other electronic means.

Current transaction-verification systems and methods, such as for credit, debit, and purchase-card purchases and payments, Automated Teller Machine (ATM) interactions, e-ticket redemption, and the like, may be grouped into four broad categories: 1) physical identification of the purchasing party or of a difficult-to-mimic characteristic of the purchasing party, such as by signature comparison or biometric scanning, 2) data entry of passwords or other identification codes, such as the Personal Identification Number (PIN) codes used with ATMs and calling cards, 3) validation of embedded digital authenticating information, such as is found in "smart cards", and 4) verifying private knowledge presumed known only to the account holder, such as the account holder's billing address or Social Security Number (SSN), prior to approving a transaction, including opening, closing, and modifying an account. A fifth category, devoted to limiting the exposure of sensitive private information such as credit card numbers to insecure or weakly secure environments subject to high levels of electronic theft or hacking, such as the Internet, is the substitution of dummy information for the actual private information, which dummy information is reconciled with the actual private information after its receipt by the payment processing organization.

Additional systems and methods have been employed by credit reporting agencies, which agencies already monitor the status of individuals' credit accounts. Such organizations may offer their customers regular monthly communications by mail or electronic mail identifying new accounts established in the customer's name or with the customer's federal tax identification number since the last such communication.

Especially in categories (2) (3) and (4) above, transaction approval by a bank or other merchant processing or payment processing organization or network is often coupled with an automated risk detection processes and human follow-up, as when a credit card issuer's risk assessment system determines that an unexpectedly large, out-of-state purchase is "high risk" for a given account holder, and then provides that information to a customer service representative who may call the account holder's telephone to attempt to confirm the transaction's validity, typically after the fact, or to leave a message for the account holder that the card account is suspended pending the account holder's reply. It is often the case that the account holder's ability to judge what constitutes a fraudulent transaction conducted in his/her name considerably exceeds that of said risk assessment system and customer service representative. Despite this judgment-gap, today's account holders have, at best, only after-the-fact means available to them from their financial institutions, or from merchants, to audit transactions occurring in their name, including the opening, closing, and modification of accounts, or at-the-time means which involve significant new technologies and new processes to implement, learn, and use. In some cases the burden of implementing, learning and using falls on the merchant or other provider of goods, services, or funds, as well as the account holder.

Merchants subjected to fraudulent transactions are informed after the fact as well, when the true account holder disputes a transaction with his/her payments organization. In the case of credit card transactions, the merchant is then charged back for the value of the disputed transaction and may also be charged a dispute investigation fee, resulting in a loss of profits and goods.

Additional research and development in the payments industry has focused on adding encrypted identifying codes or digital certificates to credit cards via an embedded microprocessor (as in "smart cards") or via software on a personal computer ("e-wallets"); and on physically printing unique numeric identification numbers or numeric passwords (such as CVV2/CVC2/CID codes) on credit cards. Said codes are a relatively recent security feature for use in "card-not-present" transactions and now appear on, for example, Visa, MasterCard, American Express and Discover cards. As of this writing, these codes are comprised of a three- or four-digit number which provides a cryptographic check of the information embossed on the card, called CVV2 (Visa, 3-digit), CVC2 (MasterCard, 3-digit), and CID (American Express, 4-digit, and Discover, 3-digit). These code values help validate two things: a) the customer has the physical credit card in his/her possession, and b) the card account is legitimate. CVV2/CVC2/CID data are printed only on the card; they are not contained in the magnetic stripe information per se, nor do they appear on sales receipts or statements. The use of these codes attempts to make it more difficult for a person who has stolen a credit card number, but not the actual card, to enter into fraudulent transactions, provided the other party or parties to such transactions have also invested in the requisite changes to their systems and processes to support the use of these codes.

The prior art attempts, with mixed results, to solve the common problem of how to authenticate and verify a transaction, such as purchase, funds transfer, account opening or closing or modification, etc., particularly when conducted remotely or electronically; how to authenticate and verify the relevant party or parties, and how to provide the earliest possible warning of fraud, with a high degree of accuracy and completeness and near-zero delay.

U.S. Pat. No. 6,182,894 to Hackett describes systems and methods to use CVV2/CVC2/CID values, in lieu of PIN codes, to verify that a consumer engaged in a point-of-sale (POS) transaction possesses the transaction card at the time of purchase and/or is the true card owner. The CVV2/CVC2/CID information is provided to the POS system as an additional authenticating datum, and if said datum matches what is stored in the relevant authorization system for the applicable card account number, and authorizing parameters are satisfied, authorization proceeds. If not, authorization is denied. Such systems and methods do not protect against card theft or hacking (should such CVV2/CVC2/CID data flow from the consumer to the merchant or card processor electronically, or are stored on an intermediate system), because they authenticate only that certain data from the physical card match data stored in the authorization system, without authenticating the identity of the card holder/user, and without verifying the intentions of the true card owner or other co-authorizing party (if different). Further, they do not provide the advantage of notification of the true card owner or other co-authorizing or auditing parties of the occurrence of a transaction, and in particular a high-risk transaction. Finally, such systems and methods also fail to provide for any additional automated data gathering, authentication, and verification for and by the party regarding the opening, closing, or modification of an account remotely.

U.S. Pat. No. 5,727,163 to Bezos describes a system and method for concluding a transaction by telephone that was initiated over the Internet. The purchaser dials a special telephone number associated with the transaction and provides his/her credit card number in full by dialing it on his/her touch-tone keypad (that is, using DTMF tones). Such a system and method have the advantage of partially isolating private payment information across two different communication links, but do not address the problem of notification or authentication of the legitimate account holders or other parties having a potential interest in the transaction, nor verification of the intent and approval of said legitimate account holders or other parties having approval authority for the transaction. Instead, they provide assurance solely to the purchaser that his/her private financial information need not be communicated in full through a network perceived to be insecure (that is, through the Internet). Such a system and method, which require purchasers to take additional proactive steps to complete remote transactions, have had limited adoption by consumers and merchants due to the complexity they add to all affected transactions. This system and method are further limited to collecting payment data, such as a credit card number, for processing by the merchant's point-of-sale or ordering system, under the purchasing party's control. They do not provide for any additional data gathering, authentication, and verification for and by the party attempting to collect payment or open, close, or modify an account remotely, nor for and by any third party whose approval is normally required to conclude the transaction.

U.S. Pat. No. 6,324,526 to D'Agostino describes a system and method for providing a transaction code, supplied case by case by the purchaser's financial institution, in lieu of a credit card number for a purchase transaction. As has been noted, systems and methods based on dummy transaction or account number codes have had limited consumer acceptance because of the complexity to set up and use them. Such systems and methods attempt to address only the security of the purchaser's account information, by eliminating exposure thereof to a third party over a network perceived to be insecure (that is, over the Internet). Nor do such systems and methods provide for any additional data gathering, authentication, and verification for and by the party attempting to collect payment or open, close, or modify an account remotely; nor for and by any third party whose approval is normally required to conclude the transaction.

U.S. Pat. No. 6,270,011 to Gottfried describes a system and method for coupling a fingerprint recognition device to a credit card scanner. As has been noted, systems and methods of this type have extremely narrow application because of the need for the affected parties' physical presence, the associated cost of implementation and on-going support, and general public concerns over personal privacy when biometric devices are employed. Systems and methods of this type attempt to address only authentication of a purchaser's identity, and ignore notification of a party or parties who may be subject to identity fraud or fraudulent transactions.

U.S. Pat. No. 6,341,724 to Campisano describes a system and method for using the telephone number of a credit card owner, plus a PIN code, as an alias for the actual card number in a credit card transaction. This system and method replace the account number with another sequence of digits which is not printed or encoded on the credit card itself. Systems and methods of this type are a variation on the concept of a dummy account number, per U.S. Pat. No. 6,324,526 to D'Agostino, and provide the benefit of allowing a purchaser to make a credit card purchase without having to remember his/her card number. However, such systems and methods do not provide protection against the use of stolen account information, nor against the use of stolen dummy account information such as said telephone number and PIN. They further require credit card users to learn a new process for making credit card purchases, and require system and rule changes by merchants to allow the purchaser's telephone number and PIN to be used in lieu of a card account number. For debit card transactions, the purchasers would further have to supply two PIN values, one for the debit card account, the other for encryption purposes. Nor do such systems and methods provide for any additional data gathering, authentication, and verification for and by the party attempting to collect payment or open, close, or modify an account remotely; nor for and by any third party whose approval is normally required to conclude the transaction.

U.S. Pat. No. 6,023,682 to Checchio describes a system and method for communicating a credit card number to a payment-authorizing computer system from a point-of-sale credit card terminal, using encryption where the key is a personal identification code ("PIC") belonging to the card owner, and then verifying that the personal identification code matches that stored in the payment-authorizing computer system's memory. This system and method introduce the advantage of using personal information (such as a PIN code) to verify a card-user's identity, but also require changes to payment authorization systems and merchant's order-taking or payment-processing systems to implement, further require the purchaser to supply his/her personal identification code to the merchant, and have utility only at a physical point-of-sale, that is, in a non-remote transaction. Because the PIC is communicated through the same process and media as the transaction itself, said personal identification code, particularly for e-commerce transactions, is vulnerable to theft via hacking of the merchant's systems or interception of the merchant's communications to the payment-processing bank or applicable credit card processing network. Such systems and methods also fail to provide for any additional data gathering, authentication, and verification for and by any third party whose approval is normally required to conclude the transaction.

U.S. Pat. No. 6,088,683 to Jalili describes a method for customers to order goods from merchants on one network, such as the Internet, and then complete the purchase via a second network, such as the telephone network, using "Caller ID" service or a call-back to check the customer's telephone number as a form of proof of the customer's identity, and involving an independent processing center that receives the customer's financial information over the second network in advance and stores it for future reference. The merchant uses the second network to deliver transaction details and the customer's ID to the processing center, which then uses the second network to receive or initiate contact from/to to the customer to check his/her identity and his/her purchase intentions. Said method revises the method described in U.S. Pat. No. 5,727,163 to Bezos, by moving responsibility for the exchange of the customer's financial information from between the customer and merchant over a second network at the time of the transaction, as per Bezos, to between the customer and processing center over a second network in advance of the transaction. In Jalili, the processing center also performs the step of debiting and crediting the accounts of the customer and merchant, respectively. Therefore, the utility of this method is limited to cases wherein both a purchaser and a merchant are independently willing and able to establish an advance relationship with, exchange private information (such as account information for the purchaser and merchant processing information for the merchant) with, and allow debiting/crediting of their accounts by, such a processing center prior to entering into a purchase transaction between themselves. The method is also limited to purchases, and particularly to purchases involving a single customer and a single merchant. The need for a preparatory process occurring over the second network, the need to use the second network to perform all steps to prepare and conclude a transaction other than the step of the customer's placing of his/her order, and the need to establish a processing center, also limit the utility of this method. Because the purchaser does not actually supply his/her payment information to the merchant, the method further creates an opportunity for fraud perpetrated within processing center, stemming from its unique position of trust between the two other parties. If, however, the processing center is not independent of the merchant, then any utility derived from the separation of the processing center from the merchant, such as the assurance to the customer that his/her private account information need never be transmitted directly to the merchant, is lost. The method also adds the complication of the merchant having to provide a new and additional or alternative form of customer identification information to the processing center in order to receive a customer's payment. The method also fails to provide for any additional automated data gathering, authentication, and verification for and by a party regarding non-purchase transactions, such as the opening, closing, or modification of an account remotely; nor for and by any third party whose approval is normally required to conclude a purchase transaction. The method also fails to address purchases or non-purchase transactions initiated other than via a network. Lastly, the method requires a new sort of account to be established, namely, the customer's registration with the processing center.

Additional weaknesses and limitations of the prior art in general include:

Systems and methods of physical recognition: Such systems and methods require deployment, training, and support of a new purchaser and/or merchant transaction-processing infrastructure on a wide scale (such as deployment of biometric scanners and related interfaces to payment systems) and require the physical presence of purchaser to interact with that infrastructure to complete a transaction. This solution is therefore highly limited in the scope of its application.

Systems and methods using passwords and ID codes: Generally effective for ATM and debit card transactions, such systems and methods are not used widely for credit card transactions. Passwords and codes (such as PIN codes) remain subject to theft (as by Internet hacking, card "skimming", identity theft, etc.). Once a password or ID code is compromised, no further safeguards are possible, and entirely new customer accounts must be created. Passwords and ID codes are not commonly used, supported and enforced by merchants for credit card purchases.

Systems and methods using CVV2/CVC2/CID codes: Systems and methods utilizing such codes are presently limited to credit card accounts only, do not protect against the loss or theft, such as by hacking, of credit or debit-and-credit cards or card account numbers along with such codes, and do not prevent the fraudulent creation or subsequent modification of an account.

Systems and methods using verification of private knowledge: Such systems and methods are vulnerable to theft of private information via hacking, and identity theft. This is particularly troublesome internationally, where the most common type of private knowledge checking in the U.S. for credit card transactions, namely, an account's billing addresses, is rarely possible today abroad.

Systems and methods using smart cards: While smart cards add password (PIN) features and can also create dummy credit card numbers usable for one transaction only, systems and methods utilizing smart cards require the installation and use of a smart card reader by the user, and have thus had limited adoption by consumers. These special features are further available only when purchases are made via the computing device where the smart card reader is installed.

Systems and methods using digital signature information ("E-Wallets"): As with smart cards, systems and methods for e-wallets require specialized software to be installed on the computing device of the e-wallet's owner, and therefore have not been widely adopted by consumers. Their features are likewise only available for purchases made via the computing device where such software is installed.

Other limitations and weaknesses in the prior art: Notification of a transaction, and any interaction with the actual party or parties who are truly authorized to conclude and approve it, as opposed to interaction with parties who are perpetrating fraud by representing themselves as said actual, authorized parties, is generally left unaddressed by the prior art. Notification or interaction which does occur in the prior art is typically after the fact, either by the actual, authorized party's reviewing his/her billing or account statements, by consulting his/her credit report via a credit reporting agency, or, if the payment processor (for example, the relevant credit card processor or bank) so determines, through a follow-up telephone call from a customer service representative of such credit card processor or bank, or through other messages delivered after the fact through a variety of basic communications media. These inherently after-the-fact processes do not interrupt or halt a fraudulent remote transaction before it is completed, nor can they halt additional fraudulent transactions (which may fit within a purchaser's normal risk profile) made quickly thereafter using the same account number or other identifying information. Prior art which attempts to address the objective of verification of a transaction before it is concluded adds prohibitive requirements for the establishment, registration with, and use of intermediaries such as processing centers between customers and merchants, fails to address the objectives of notification and approval of or by third-parties, and fails to address the class of transactions comprising the opening, closing, and modification of accounts.

It is desirable to verify and authenticate a transaction, and in particular a potentially risky transaction, without relying on the installation and use of new equipment by one or more of the parties having an interest in, involved in, or represented to be involved in, said transaction, nor requiring substantial alterations to existing processes or additional education and training for conducting such transactions, nor requiring new intermediary entities to be established. It is further desirable to do so in a manner that thwarts any potential party to such a transaction who attempts to authorize or enter into it fraudulently. It is further desirable for such verification and authentication to work even when the mechanisms, systems and methods described in the prior art may already be in use but still fail to protect fully against fraud, especially when fraud is perpetrated as a result of the theft of private information. This is especially important in the area of transactions conducted remotely, and in particular electronically. It is also desirable to notify automatically the actual party or parties having legitimate authority to approve or audit a transaction, whether directly engaged in such transaction or not, of the occurrence and/or details of said transaction. It is also desirable to determine the behavior of any embodiment of a system and method for such notification, verification and authentication, through the use of stored profiles of parties and transaction types and other parameters, and also through profile information and other parameters which may be provided with and as part of an individual transaction.

The invention described herein provides a method and system for verifying, authenticating, and providing notification of a transaction, such as a commercial or financial transaction, with and/or to at least one party represented or identified as engaging in said transaction or having a potential interest in said transaction or type of transaction, in particular a remote or electronic transaction, while it occurs and/or after it occurs, via one or more of a plurality of communication links and communication addresses associated with said at least one party, so as to create a higher degree of certainty that the transaction is non-fraudulent than is possible using any of the prior art, without introducing significant delay in the completion of legitimate transactions, and without requiring implementation of new equipment or software, or learning of unfamiliar processes or technologies, or establishment and use of separate processing centers or other intermediaries.

BRIEF SUMMARY OF THE INVENTION

It is an object of the invention to provide a means of verifying and authenticating the identities and intentions of one, some or all parties represented or identified as engaging in a transaction or having a potential interest in said transaction or type of transaction while it is in progress, and/or soon thereafter;

It is also an object of the invention to provide a means of accepting or obtaining information and parameters about said transaction, including information about one or more parties represented or identified as engaging in or having a potential interest in said transaction, from a transaction-processing system or device, such as a banking transaction system or credit card authorization or risk assessment system, as it is processing the transaction;

It is also an object of the invention to provide a means of communications with and/or to one or more parties having a potential interest in the transaction, some of whom may be represented as engaged in the transaction through the use of identity-related data, such as an account number or numbers;

It is also an object of the invention to provide a means of defining, at the time of the transaction or in advance of the transaction, or both, which specific parties have a potential interest in a given transaction, and the nature of such interest;

It is also an object of the invention to allow said communications to occur over a plurality of communications media and/or communications links, to increase the likelihood of successful and secure communication with and/or to said one or more parties, It is also an object of the invention to provide a means of defining, initiating and controlling said interactions and their content;

It is also an object of the invention to provide a means of obtaining and/or storing information about the nature, communication addresses, and other parameters of said one or more parties' communications devices used for said communications, to enable additional verification and authentication of the identity or identities of said one or more parties;

It is also an object of the invention, in its preferred embodiment, to allow the behavior of said preferred embodiment to be controlled and managed under varying conditions and circumstances in accordance with stored profiles and, additionally or alternatively, in accordance with information provided along with the transaction information;

It is also an object of the invention to provide a means, in its preferred embodiment, for the adapting the inventive systems' behavior based on prevailing conditions and circumstances regarding said transaction, which conditions and circumstances may change during or because of the utilization of the invention;

It is also an object of the invention to provide a means of recording and remembering the details of said transaction and the result or results of any subsequent communications for later review and use by the user of the invention;

It is also an object of the invention to provide a means of reporting and/or transmitting and/or forwarding a result or results regarding said transaction and said result or results of said subsequent communications.

Accordingly, the invention, to address the above and other objects, provides a system and method for verifying, authenticating, and providing notification of a transaction, such as a commercial or financial transaction, with and/or to at least one party represented or identified as engaging in said transaction or having a potential interest in said transaction or type of transaction, in particular a remote or electronic transaction, while it occurs and/or after it occurs, and in accordance with any parameters which may be supplied in or with information about the transaction, additionally or alternatively with any profile or profiles which may be associated with the transaction.

In the preferred embodiment of the invention, the occurrence of communications with said at least one party and at least one of a plurality of communications devices and associated predetermined communications addresses known to belong to said at least one party, using at least one communications link other than the communications link used to initiate the transaction itself, isolates the transaction medium or environment from the notification and/or verification medium or environment, such that a very high degree of accuracy and completeness of authentication and verification can be achieved with a minimum of delay, and without requiring any new authentication/verification technologies to be implemented or learned by the transacting party or parties.

The invention goes beyond current practices by providing a highly automated means and a method for, individually and in combination:

1. Notification, verification and authentication of any or all of the party or parties involved in, identified as involved in, and/or predetermined to have a potential interest in, a transaction while it is still in progress, and/or afterward;
2. Verifying and authenticating using a plurality of communications links which may operate on networks having near-universal, worldwide availability and high reliability;
3. Separating and isolating the communications link and/or medium of the initial transaction (for example, the World Wide Web) from the communications link(s) and/or medium or media used to verify and authenticate it (for example, the public switched telephone network, wireless networks, Instant Messaging services), in such cases as the transaction's primary medium is deemed insufficiently secure or insufficiently able to verify and authenticate a party or parties;
4. Utilizing a plurality of concurrent and/or sequential communications with and/or to a plurality of communications devices and addresses, using a plurality of communications links and communications media;
5. Attempting communications with and/or to any or all of the party or parties involved in, identified as involved in, and/or predetermined to have a potential interest in transaction using alternate communications links or media in the event that attempted interaction or interactions using the preferred associated communications link or medium fails;
6. Predefining and dynamically determining a plurality of sequences of actions and communications to be taken under differing conditions for differing transactions and differing pluralities of parties thereto, based on information and parameters regarding the transaction and/or user-definable profiles regarding transactions, types of transactions, and/or parties and potential parties involved in, identified as involved in, and/or predetermined to have a potential interest in such transactions;
7. Communicating with a third party or parties involved in, identified as involved in, and/or predetermined to have a potential interest in, who are not initially part of such a transaction (such as an employer, parent, or law enforcement official in performance of his/her duty), for purposes such as seeking such third party or parties' approval thereof, or to notify same;
8. Assigning one or more roles to one or more parties involved in, identified as involved in, and/or predetermined to have a potential interest in a transaction;
9. Interacting differently with each of said one or more parties based upon his/her ascribed role;
10. Avoiding intrusiveness in the consummation of the transaction, by eliminating the need to install and proactively use any new or unfamiliar equipment, software, processes, or purchasing methods by the party or parties having an interest in, involved in, or represented to be involved in the transaction;
11. Intermingling of parameter-based non-transactional information, such as sales, marketing, product or support information, with transaction and confirmation information in said communications, and
12. Predetermining and/or dynamically determining the format and content of said communications, such as via user-defined templates and/or scripts.

The preferred embodiment of the invention associates one or more predetermined communications devices and addresses, such as telephone numbers or wireless SIP addresses, with a plurality of parties who may have an interest in, be involved in, or be identified as involved in, a transaction, and related identifying information, which may include an account number or credit card number. Such identity, device and address information are preferably defined and stored in advance in a non-volatile storage or database in the form of a profile associated with each such party, or are additionally or alternatively provided to the inventive system within or along with information about a specific transaction.

When a transaction is initiated with reference to such party or parties, such as via identifiers such as credit card account number(s), bank account numbers, or Social Security Numbers (SSNs) or tax identification numbers, a central system then attempts to communicate via a plurality of communications links with and/or to one or more of said plurality of parties via at least one of each such party's known, predetermined communications device(s), to notify the party or parties of the transaction and, additionally or alternatively, to interact with the party or parties to authenticate and verify their identities, intentions and/or approvals in regard to the transaction. The invention further provides several alternative means and methods for establishing such communications with and/or to each such party, either in parallel or serially, in the event that the primary means and/or method associated with each such party is not successful. Each communication or set of communications is preferably governed by logic rules, which may be predefined or dynamically determined, and which may be encoded as a script to be executed in or by the central system, said rules being determined in part based upon a categorization of the transaction, the identities or a categorization of one or more of said plurality of parties, and/or other parameters obtained along with the information describing the transaction.

Because each such interaction occurs with the actual owner/user of the communication device at a known and predefined communications address (such as his/her pre-verified wireless SIP address), if any party engaged in the transaction is not the owner/user of said predefined communications address, then 1) the interaction by definition alerts the actual owner/user to a fraudulent transaction in progress, and 2) the fraudulent owner/user is thwarted, because he/she will be physically unable to authenticate him/herself using the communications device found at said communications address. Further, even if the fraudulent party is able to obtain such a communications device belonging to the true owning/using party, the fraudulent party must still supply further authenticating information presumed to be known only to the actual owning/using party. Preferably, the communications linkage employed for such interaction is different from the communications linkage used to initiate the transaction, thereby further limiting the potential for fraud and for the theft of private information.

Additional utility may be derived when the user of the invention is in the role of a financial services organization, such as a credit card issuer, payments-processing network, merchant processor or acquirer, employing the invention alongside or within its transaction-authorization and/or account-management processes and systems to reduce transactional risk for its merchant and/or consumer customers. Such financial services organizations already have, in the normal course of their business, advance knowledge of potential parties to transactions, including identifying information and other parameters about such parties which may include their account numbers and their contact information, such as home telephone numbers, e-mail addresses, and wireless device addresses; knowledge of transactions relating to their customers as they occur; and a presumed relationship of trust with said potential parties to transactions. Their advance knowledge and existing trust relationships minimize their effort to implement and widely deploy the invention for maximum utility. In addition to the fraud-reducing and fraud "early warning" benefit of the invention, financial services organizations may also benefit from improved customer relationships through increased value-adding contacts occurring as a result of the use of the invention, and from the resulting higher level of service provided. Financial service organizations that employ the invention may also benefit from the utility of a reduced perception by their consumer and merchant customers of the risks of conducting transactions electronically or remotely. Note that the additional utility to entities in the role of financial services organizations is not inherently limited to such entities, nor is it the only additional utility they may obtain. This and other additional utility may be also be obtained by other users, whether utilizing a similar or alternative embodiment of the invention.

In the preferred embodiment of the invention, when a transaction message is received by the central system from a second system or device, the central system parses the received message, authenticates said second system or device, and then may use the parsed data values to determine or derive a set of corresponding rules that inform or define the central system's subsequent actions and subsequent communications with or to a relevant party or parties over a plurality of communication links. Such rules may be predefined, and if predefined are stored in advance in the central system's volatile and/or nonvolatile storage memory or database(s). The central system takes a plurality of actions according to said rules.

In the preferred embodiment, the central system may establish a plurality of communications links, which may include but are not limited to wireless and landline telephony, SMS and wireless text messaging, instant messaging, and electronic mail and other Internet Protocol (IP) transmissions, in a sequence defined by said rules, to reach a plurality of parties having a potential interest in, involved in, or represented to be involved in, said transaction. The central system attempts to communicate with and/or to each of said plurality of parties via at least one predefined communications device specifically associated with that party.

As each of said communication links is successfully established, the central system preferably delivers information to the corresponding party regarding the transaction, which information may include 1) the transaction details, which may include the nature or purpose of the transaction and/or a total price or amount, 2) additional information of potential value to said party, such as product-, sales-, service- and/or marketing-related information provided by the other party/parties or a third party or parties, and 3) other parameters, which may include identifying information regarding one or more of said parties. Said delivery of information is preferably composed and formatted by the central system per a predefined message template or script that may be related to the transaction or the type of transaction, the communications medium employed, and the language in which the party is known to be conversant. For example, in a telephone call, said delivery of information may be comprised of concatenated segments of prerecorded audio and/or text-to-speech synthesis.

Each such party may then be prompted to confirm his/her identity and intentions, which may include providing a PIN code, CVV2/CVC2/CID code (for a credit card), or other unique and private identifier(s), such as the initial letters of his/her mother's maiden name, which datum or data may be predefined to the central system, or may be supplied within or derived from the initiating transaction message. A confirming action or actions may be performed by said party via said communications link, using a means appropriate to his/her corresponding communications device. For example, on a telephone, DTMF digits may be pressed to convey the information prompted for by the central system.

Based on the results of said interaction(s) with said plurality of parties, the central system preferably computes or otherwise derives a result, which it then preferably transmits to said second system or device from which the transaction message originated, and/or to an associated third system. Further, based on said retrieved stored rules and/or said dynamically derived rules, the central system also preferably transmits one or more of a plurality of notification messages about said transaction and said result to one or more of said plurality of parties, over a plurality of communication links, and may also log said results in a nonvolatile memory or other storage or database for later retrieval, action, and/or analysis, and/or for billing purposes.

The central system communicates through a plurality of communications links using a plurality of communications protocols, configured according to such rules as are to be supported and implemented in any specific embodiment of the invention. These communication links and protocols may include but are not limited to wireless and wireline telephony (which may include text-to-speech processing, recorded speech, DTMF tones, and combinations thereof), electronic mail, instant messaging (IM), fax, paging, Short Message Service (SMS) and other wireless text messaging, and other existing widely used services and protocols, as described more fully hereafter. In the preferred embodiment of the invention, the central system also provides a means to add and delete a plurality of types of communication links and protocols, as such types of communication links and protocols become available and desirable or cease to be available or desirable; and a means of receiving, translating, and acting upon a plurality of informational codes and formats of transaction message as may be provided by differing types of second system or device originating such transaction message under differing conditions.

BRIEF DESCRIPTION OF THE DRAWINGS

FIG. 1. System Diagram—Preferred Embodiment
FIG. 2. Application Programming Interface Generalized Schema
FIG. 3. Networking Configuration
FIG. 4. Remote Transaction Engine Communications Interfaces—Data Messaging Layer
FIG. 5. Rules Database View
FIG. 6. Profiles Database Views
FIG. 7. Party-Transaction Group Profiles Database View
FIG. 8. Communications Sequence Patterns Database View
FIG. 9. Scripts Database View
FIG. 10. Message Templates Database View
FIG. 11. Communications Subsystems: Telephony
FIG. 12. Communications Subsystems: E-mail
FIG. 13. Communications Subsystems: Instant Messaging
FIG. 14. Communications Subsystems: Fax
FIG. 15. Communications Subsystems: Paging
FIG. 16. Communications Subsystems: Wireless Text Messaging/Short Message Service
FIG. 17. Communications Subsystems: Wireless Telephony
FIG. 18. Communications Subsystems: IP Telephony
FIG. 19. Communications Subsystems: Internet Data Protocols—HTTP/HTTPS using HTML/XML
FIG. 20. Communications Subsystems: WAP
FIG. 21. Communications Subsystems: Telex
FIG. 22. Communications Subsystems: FTP
FIG. 23. Communications Subsystems: SNA/RJE Datasets
FIG. 24. Communications Subsystems: EDI/EDIFACT/EDI-INT
FIG. 25. Generalized Process Diagram
FIG. 26. Communication Scripting Language Statements, Object Methods, Properties, and Environment Variables
FIG. 11-FIG. 24 are schematics of the links between a preferred embodiment of a system according to the invention and a range of potential communications devices used or usable by potential parties to a transaction.

DETAILED DESCRIPTION OF THE INVENTION

The invention achieves a very high degree of accuracy and completeness of authentication, notification and verification of a transaction and the identity and intentions of one or more of the plurality of parties represented as entering into or conducting the transaction, with a minimum of delay, and without requiring new authentication/verification technologies to be implemented or learned by such parties, by:

a) Automatically communicating with and/or to the relevant party or parties represented as conducting a transaction, such as an electronic or remote transaction, using at least one communications link which is typically and preferably other than the one used to initiate the transaction itself, if any;

b) Communicating with and/or to said party or parties only on communications devices having specific predetermined communications addresses known to belong to them, as a mechanism of additional authentication and verification;

c) Additionally or alternatively, further verifying said party or parties' stated identities by cross-checking physical information known or discernable about their communications devices (e.g., telephone Automatic Number Identifier value) with other, external sources of identity information (e.g., a telephone number billing address database);

d) Notifying said party or parties of the transaction's details, such as a merchant's identity, purchase amount, etc., through said communications devices;

e) Additionally or alternatively, providing supplemental information of potential utility to said party or parties, such as sales, marketing, product and support-related information, through said communications devices;

f) Additionally or alternatively, interrogating said party or parties to further authenticate their identities and/or verify their intentions regarding the transaction using said at least one communications link;

g) Additionally or alternatively, further verifying said party or parties' stated identities and intentions by obtaining confirming input from said party or parties, through said communications devices, which may include passwords or other private knowledge (such as a predefined PIN code, predefined CVC2/CVV2/CID code, or several initial letters of a predefined security word such as a mother's maiden name) through said communications devices;

h) Enabling communication with and/or to one or more of a plurality of parties related directly or indirectly to the transaction, some of whom may not have been identified or were not known to either the initiating parties or to the system or entity (remote to the inventive system) responsible for processing the transaction, and i) Supporting stored, user-definable profiles, rules, and parameters regarding such transactions and such parties, which profiles, rules, and parameters, in a preferred embodiment, are used to vary the behavior of the inventive system and thereby the sequence of steps followed in the inventive method.

outside the transaction environment itself. The above advantages apply whether the transaction is still in progress, or after the fact.

FIG. 1 presents a potential embodiment of a system consistent with the invention. FIG. 25 shows a generalized process flow for authenticating and verifying a typical transaction using said embodiment of a system, consistent with the invention.

In FIG. 1, a Remote Transaction Engine [1], such as a web e-commerce server or a credit card authorization system or device, processes a transaction initiated by one or more parties. The RTE [1] may, for example, be operated by a merchant conducting remote transactions (as by Internet or by telephone) with its customers; by two or more parties seeking to exchange goods, services, or funds; by a financial institution conducting a financial transaction with a customer (as via Automated Teller Machine); by a payment processor organization in behalf of a merchant; by a payments clearing network in behalf of a payment processor organization; by a payment-account issuer in behalf of the payments clearing network and the customer; by a financial institution or merchant establishing or modifying an account such as a credit account for a customer or prospective customer, or by a service bureau in behalf of any of these. The sole requirement of the RTE [1] is to be able to provide a data message via an application programming interface [11] ("API") means, predefined specification means, or other equivalent means to the Central System [2] ("CS") of the embodiment of the invention, via any one of several standard communications protocols over a communication link or network [31]. This transaction-describing message shall hereafter be called the Transaction Message.

FIG. 4 presents a plurality of communication links which may be utilized in an embodiment of the inventive system for receipt of said Transaction Message from the RTE [1]. A plurality of preferred data communication link types [411-420] is shown, plus a voice-based communication link based on DTMF signaling [421]. The inventive system preferably further accommodates adding other and future protocols [425] as interfaces for them become desirable and available, and removing existing protocols as they cease to be desirable or available. Different embodiments of the invention may support varying sets of such communication links from system to system, or on the same system over time.

The Transaction Message is received by the CS's [2] Data Messaging Layer [FIG. 1, 201]. The Data Messaging Layer [201] is comprised of various hardware and software modules and interfaces for receipt, queuing and interpretation of messages from a plurality of networks [FIG. 4], and may be implemented, for example, using technologies such as message queuing middleware for data communications, and an Interactive Voice Response (IVR) unit for DMTF-based telephony messages.

The Transaction Message, if communicated over a public data network or other potentially insecure network, such as the Internet, may be further encoded or encrypted either in whole or in part by the RTE [1] for added security, such as with PKI encryption or a similar standard encrypting protocol, such as the Internet's TLS.

The preferred CS [2] in general is further comprised of one or more processors; memories and data storage; software and software libraries, such as may be written in and accompany the C++ and Java programming languages, for handling and manipulating said message as described hereafter; an operating system for managing low-level elements of the system; security elements, such as firewall and/or encryption software, for limiting external access to the system, encrypting content, and defending against various forms of electronic attack upon it; and, database or other data-managing software, to store, manage, and perform searches and retrievals on information about parties, transactions, transaction processing rules, communication methods, and the like, as more fully described hereafter. The CS [2] is additionally comprised of a range of communications hardware and software, collectively referred to as the "Communications Subsystems," which are used to notify or interact with one or more of a plurality of parties represented or identified as engaging in a transaction or having a potential interest in a transaction. Said Communications Subsystems [211-218, ff.] are described further hereafter.

The minimum necessary contents of said Transaction Message are shown in FIG. 2. The choice of minimum necessary contents may vary from embodiment to embodiment of the inventive system. These data fields and values 1) identify the transaction-originating entity [21a], 2) provide a mechanism to authenticate it [21b], 3) identify one or more parties having a potential interest in, involved in, and/or represented to be involved in, the transaction [22a, ff., 22b, ff.], 4) identify the type of transaction [22c], such as a credit card purchase with card-not-present, and 5) identify the price or amount of the transaction [22d] if applicable. Preferably, the types of transactions known to the system are all user-definable in advance through the User Web Client [FIG. 1, 251] (see below) or via a bulk or automated load to the CS's [2] databases.

Additional data fields and values may be supplied in the Transaction Message to further define the party or parties' communication addresses to be used in authenticating this transaction [23c,f, ff., 23d, ff.]; a specific stored Rule Set (see below) to be invoked [23i]; a specific stored message content template to be used either for this transaction in general [23j,k] or for each party [231, ff.]; additional information to transmit to the relevant party or parties during the communications sessions which follow [23o,p], and the like, as enumerated more fully in FIG. 2. There is also specific provision for a mechanism to include user-defined fields and data values within said Transaction Message [23p]. These additional data in the Transaction Message, if present, preferably supersede such values as may be stored in advance in the CS's [2] databases about a given type of transaction, parties, Rule Sets, and so on.

The message protocol and format of the Transaction Message is defined according to the physical or logical port and/or communication service through which it arrives at the CS's [2] Data Messaging Layer [201], and additionally (for certain types of Internet messages) according to meta-tags and/or content-descriptor codes found at the start of the message which further define the formatting and content of the message. The message is parsed by the Data Messaging Layer [201] according to said format and protocol, and thereby decomposed into a series of name-value pairs which correspond to the data fields shown in FIG. 2. The incoming data are thus normalized into a standard internal format for subsequent processing, independent of their originating format.

If the minimum required information as identified in FIG. 2 is not present, or if the RTE [1, 21a-b] cannot be authenticated, the CS's [2] Data Messaging Layer [201] rejects the Transaction Message and sends a corresponding rejection message back to the RTE [1]; in a typical embodiment, the rejection message is composed and transmitted via the same protocol used for receipt of the incoming message [FIG. 4, 421-431].

Where any name-value pair is not defined in the message, default values are looked up in the CS's [2] primary database tables and views [FIG. 5-FIG. 8] using the RTE ID [21a], transaction type [22a] and party identifiers(s) [22a, ff.] as the index values, via, for example, an SQL query or a stored (database) procedure. Note that the CS enforces that any variable-length lists of required name-value pairs, such as the list of parties, require at least one name-value pair be explicitly defined in the incoming Transaction Message for said message to be deemed valid.

If any of the parties is a member of a Party Group, either by prior association therewith through the CS's [2] Parties database view, shown in FIG. 6 [6d], or as superseded by data in the Transaction Message, per FIG. 2 [23f], the Data Messaging Layer [201] adds the identities [FIG. 7, 7c] and roles [7e] of the parties belonging to the corresponding Group to the list of parties to be contacted for the transaction. In this way, certain transaction types for a given party may automatically spawn communications with additional parties, such as an employee's work supervisors or auditors, a minor's parents, or law enforcement personnel, without requiring explicit mention of such additional parties in the incoming Transaction Message. Such Groups are preferably user-definable in advance, via the mechanism of the Profile databases [FIG. 6] and the User Web Client [FIG. 1, 251]. This feature of the invention creates significant advantages over the prior art, by allowing automatic inclusion of a variety of additional parties in approval, notification and auditing roles.

Each party is given a Role in accordance with its Profile [FIG. 6, 6k], if any; its inclusion via the Party Group mechanism [FIG. 7, 7e]; or, as superseded by data in the Transaction Message, per FIG. 2. Another important advantage of the invention is the automatic assignment of Roles to the party or parties of the transaction, such that different actions may be taken in regard to each party based upon not only the party's identity but also the Role of the party in the transaction. One embodiment of the invention uses roles such as "Confirm" for a party that is to provide input to the inventive system, once contact has been established therewith, for example to further authenticate his/her identity and re-approve the transaction; "Notify" for a party that is only to be made aware of the transaction by the inventive system, and "Present" for a party with whom contact is not to be established, but whose related data and parameters are to be consulted and validated by the inventive system as part of the computation and delivery of a result message to the RTE [1].

Once the incoming Transaction Message's contents are validated, the full list of target parties and their roles is defined, and all relevant name-value pairs that enable subsequent processing are established, then a software-based object or other data structure (the "Transaction Object") containing these data is created in the CS's [2] volatile and/or nonvolatile memory or storage. The Transaction Object is then queued for subsequent processing by the Rules and Script Processing Layer [202] ("RSP") of the CS [2].

The RSP [202], in addition to sharing the basic elements of the CS [2] as described above, is comprised of programming and database logic for the execution of both stored and dynamically-defined Action Scripts, where such Action Scripts define generalized, parameterized processes for communicating with and/or to one or more parties. The basic functions and components of such Scripts are shown and described in detail in FIG. 26. The concept of fully user-programmable, adaptive, dynamic logic to control both the processing of individual transactions and the execution of the related communications with one or more of its parties is an important innovation introduced in and enhancing the value of the invention, by allowing the inventive system to perform a variety of distinct actions and sequences of actions based on each transaction's type, parties and roles, and prevailing conditions and parameters, and on the real-time progress of the transaction through the inventive system.

The RSP [202] draws on the queue of work created in the CS's [2] memory or other storage by the Data Messaging Layer [201], each work item being one Transaction Object comprised of 1) name-value pairs describing the transaction, as manipulated by the Data Messaging Layer [201] and available to scripts as Environment Variables (see FIG. 26), 2) an associated Script, designated as described below, and 3) an evolving set of pending and actual communications link sessions and the results thereof, further described below.

Transaction Objects may be drawn from this queue in sequential order, unless there is an overlap among the identified parties of two or more such Transaction Objects. In such a case, the following logic is preferably applied: 1) If the parties' roles are all, for example, "Notify" [per FIG. 6], the Transaction Objects may be merged, such that multiple notifications of multiple transactions may be sent to the same parties using the same communications sessions. 2) If any of the parties' roles are, for example, "Confirm", then the second Transaction Object is not drawn from the queue by the RSP [202] until the RSP [202] has completely finished working on any prior overlapping Transaction Object(s). This gatekeeping logic creates a unique advantage by prohibiting conflicting (and potentially confusing, or inherently failure-prone) communications link attempts to the same party or parties at the same time.

The Script associated with a given Transaction Object may preferably be determined as follows. First, the Rule Set [FIG. 2, 23i] for the transaction, if identified in the incoming Transaction Message, is found in the Rules database view [FIG. 5] using, for example, an SQL query or stored (database) procedure. If it was not so identified, a corresponding default Rule Set matching the transaction type and party is found in the CS's [2] Profiles database view [FIG. 6, 6e] using, for example, an SQL query or stored (database) procedure. If the corresponding Rule Set returned by the query is null, a System Default Rule Set may be used in its place.

Once the Rule Set is known and associated with the Transaction Object, its record in the Rule Set database view may be used to provide the following information, which may be used to control the further processing the transaction, per FIG. 5:

Message Template ID [5b], along with the Transaction Language [5d], defines what message template (per FIG. 10) will be used to generate the contents of the actual communications with the party (or parties) for this transaction. This value becomes an Environment Variable (see FIG. 26) for the transaction.

Message Template Stylesheet URL [5c] alternatively or additionally allows a web-based stylesheet, such as an XML-based (i.e., XSL) document, to be retrieved and used to format the aforesaid message to the party (or parties), via reference to a Universal Resource Locator (URL). This provides the advantage of allowing the operator or user of the RTE [1] to dynamically redefine the presentation of information to the relevant parties merely by updating an accessible web site with a new presentation format applicable to one or more of the transactions said RTL [1] may originate.

As such, this aspect of the inventive system is an important innovation, by providing its users with a programmable message content and formatting mechanism that need not be maintained in or supplied to the inventive system, but may instead be incorporated dynamically, by reference, at the time the transaction is processed.

Transaction Language [5d] is used along with the Message Template ID [5b] to define the message template.

Transaction Currency [5e] is used when financial amounts are referenced in the communication to or with the party or parties.

Confirming Value Type [5f] defines what form and format of datum is required as input from the party to successfully authenticate and verify the transaction and the party's identity. It may be a value such as "PIN" for a PIN code, or "CVV2," "CVC2," or "CID" for a credit card confirmation code, for example.

External Media Address Reference Flag [5g], if True, indicates that an external database call shall be made to a service provider [FIG. 1, 12, "Remote Data Sources"] or other external data source which can provide additional information about the party's communication address or identity, such as the billing telephone address for the party's home telephone number, for cross-referencing and/or logging purposes and/or for later use in computing the result for the party.

Allowed Media [5h] encodes, such as in a text string or binary value, the types of communications links and/or media applicable to this type of transaction for this party. This media list acts as a filter on the party's communication profile records [FIG. 6], limiting the communication link alternatives for the party to only those link and/or media which are coded for in the Allowed Media [5h] field. For example, the party may have e-mail as one communication preference, but for a certain transaction type, the Allowed Media [5h] filter value keeps e-mail from being used to authenticate and verify the party and his/her intentions for the transaction, for example to avoid the time-delay and relatively low level of security associated with e-mail-based communications, while for other transaction types, e-mail is still used, in accordance with the Profile. The RSP [202] insures that in no case are fewer than one communication link alternative in force under any circumstances, even if the use of that one alternative would otherwise violate the Allowed Media [5h] filter.

Script ID [5i] defines which Action Script [FIG. 9 and FIG. 26] is to be employed for the transaction. (The Script defines how the CS [2] will interact with the party or parties hereafter.)

Default Communications Sequence Pattern ID [5j] identifies the default communication strategy to be used when attempting to reach the party or parties. This value may be overridden by any Communication Sequence Pattern [FIG. 6, 6n] defined in the CS's [2] databases, or in the Transaction Message, for any specific party or parties for this transaction type.

Once the above data have been gathered and stored in the system's memory or other storage along with the other transaction information aggregated into the Transaction Object, the RSP [202] executes the aforesaid Script. In general, Scripts preferably 1) attempt to establish communication link sessions simultaneously with all relevant parties associated with the transaction, and where possible, 2) deliver messages to the parties over such communication link sessions, 3) prompt for and accept input from the party of parties defined as having, for example, "Confirm" Roles [FIG. 6, 6k; FIG. 7, 7e], 4) compute an overall result summarizing the outcomes of all such communications and communication attempts, 5) optionally log the transaction, communication attempt results, and said outcomes and overall result, and 6) communicate the result back to the RTE [1].

An important advantage of the invention is the adaptive logic represented by such Scripts, in lieu of a static process logic mechanism that executes a single statically-defined sequence of instructions in every case and under every condition.

In general, for each party, the preferred embodiment's RSP [202] will perform the following standard actions under the control of the Script [5i]. Note that communications to multiple parties will occur simultaneously (unless directed otherwise by said Script) via concurrently executing, asynchronous system processes in the CS's [2] Communications Control Layer [203] ("CCL"). The process flow for the preferred embodiment of the invention, with the RSP [202] executing a Script, is diagrammed in FIG. 25, in which the RSP [202] will perform in accordance with a method comprising the steps of:

1. Perform an external database or data service query or reference [B], as of, for example, a telephone number billing address database, using relevant data about the party as a key (for example, his/her telephone number), to gather external data about the party for use in computing the result for the party and the overall result message to the RTE [1], provided the External Media Address Reference Flag [FIG. 5, 5g] (see above) for the transaction's Rule Set is True [A].

2. Consult the party's Communication Profile record [FIG. 6, 6a-c, 6i-o] for this transaction type and account number (if applicable), using an SQL query or stored (database) procedure, and then:
   a. Group all the corresponding communication devices, addresses, and media for the party by their Communications Sequence Group [6l] ("CSG") number, if applicable;
   b. Where no CSG number is assigned to a communication device, a distinct temporary CSG is assigned by the RSP [202] to each such device;
   c. Order the CSGs by the associated Communications Priority [6m] number; this step defines the order in which the party's communication devices will be tried, with the Group mechanism of step (a) collecting multiple devices to be tried together simultaneously;
   d. Identify i) the party's Role [6k] for this device, address, and media type (noting that not all supported devices and media types necessarily support two-way interactive communications), ii) the expected Confirmation Value [6o], if any, for "Confirm"-type parties (noting that this value may have been additionally or alternatively supplied in the incoming Transaction Message from the RTE [1]), and iii) the Communications Sequence Pattern ID [6n].

The above steps (a)-(d) are aggregated in FIG. 25 as process box [C], "Select Party's next device Group (CSG)".

3. For each Communications Sequence Group [6l] for the party, in ascending order of Communications Priority [6m], initiate simultaneous, multithreaded communications sessions to all devices within said CSG [6l] via the Communications Control Layer [203] ("CCL") [FIG. 25, D]. The CCL [203] initiates such sessions via commands it issues to the Communications Subsystems [FIG. 1, 212-218 ff.]

A Communications Sequence Group [6l] with more than one communications device and address in it causes the CCL [203] to attempt to reach a single party simultaneously on a plurality of his/her devices and addresses. The first such contact attempt to succeed [E] becomes the sole active communication session to the party, and all other sessions are immediately, automatically terminated [F]. This is accomplished through the CCL's [203] monitoring and analyzing session-progress events [per FIG. 8, 8k: "Generate Event on Connection Flag"] generated via the various Communications Subsystems [FIG. 1, 211-218 ff.]. In practice, most Communications Sequence Groups [6l] will contain just one device and addresses, and thus just one communication session at a time will be attempted for each party.

Once a communication session is successfully initiated with a party on a given device and at a given communication address (such as a telephone with a particular telephone number) in a "Confirm" Role [FIG. 6, 6k; FIG. 7, 7e], as per FIG. 25, no further attempts to interact with that party in its "Confirm" Role for the current transaction are preferably made. However, further communications may preferably continue to occur in a "Notify" role. This may be accomplished by the CCL [203] setting a flag or semaphore [FIG. 25, I] for the party (such as the PartyConfirmed[n]

Environment Variable per FIG. 26) once one "Confirm" contact has occurred, such that further "Confirm" devices are ignored by the CCL [203] for the current party in the current transaction [FIG. 25, M]. This feature contributes a special advantage of the invention, by allowing a given party to engage in contact with the inventive system in multiple Roles for the same transaction, such as, for example, a "Confirm" Role on his/her mobile Instant Messaging device and a "Notify" Role to his/her e-mail system.

4. Each communications device for the party has an associated user-defined Communications Sequence Pattern [FIG. 8, 8a] that is used to manage the attempts to reach and establish a communication link session with the device; for each such Pattern, consult its Communication Sequence Pattern [8a] database record, via SQL query or stored (database) procedure, to obtain the following parameters, or the equivalent, in a preferred embodiment of the inventive system:

Interactivity Flag [8b], which specifies whether input from the party is possible from said device;

Outbound/Inbound [8c], which specifies whether the communication link is to be initiated by the CCL [203] or by the party communicating inbound to the CCL [203];

Attempt Timeout Value [8d], which sets the time before an attempt is deemed to have failed (for example, for a phonecall with multiple rings and no answer);

Sequence Timeout Value [8e], which sets the total time before an entire Sequence is deemed to have failed if no successful connection occurs;

First Attempt Delay [8f], which postpones the first attempt at communication link session by a fixed amount of time (for example, to allow a party to switch his/her line from data to voice mode on a dual-purpose communication device);

Smart Retry Flag [8g], which, if True, instructs the CCL [203] to time subsequent communication attempts based on the outcome of the prior attempt (for example, retrying a phone number sooner if the last result was busy, vs. ring-without-answer);

Maximum Number of Attempts [8h], which defines a total number of attempts allowed before conceding failure;

Attempts Spacing [8i], which defines the timing between subsequent attempts, and alternatively or additionally, between specific attempts in the Sequence;

Action on Final Failure [8j], which defines whether upon the ultimate failure of the sequence, a new sequence should begin (e.g., a Sequence Pattern in which the system waits for the party to call it), or not, and Generate Event on Connection Flag [8k], which, if True, instructs the communication process executing the connection attempt to send an alert event to the CCL [203] upon success. This event is used in conjunction with Communication Sequence Groups [61] to identify which of a series of simultaneous communication link attempts to a party's several devices has succeeded first, and is thus to be continued, the rest being terminated.

5. Dispatch these data, via the Transaction Object's Script, to the CCL [203], which creates individual software processes and/or threads of execution for each potential communication link session based on the aforesaid parameters. (See FIG. 25, "Script Execution" process block.) These processes record in the CS's [2] memory and/or databases or other storage the results of all sessions and session attempts for each party for each transaction for later computation [L,R]. The design and processes of said communication sessions is described hereafter.

Once each party's communication session a) occurs successfully and, if in a "Confirm" Role, obtains the required input from the contacted party [FIG. 1, 5f; FIG. 25, H,I], such as a PIN, password, or CVV2/CVC2/CID value; b) occurs but fails to gather such required input from the party [FIG. 25, J,K], or, c) fails to occur after all attempt Schedule Patterns are exhausted [FIG. 25, N,Q], the RSP [202] is notified by the CCL [203] that all necessary sessions and contact attempts are complete [FIG. 25, S]. The RSP [202] computes a result message [T] back to the RTE [1], said message being transmitted via the Data Messaging Layer [201], preferably using the same format and protocol as the received Transaction Message. Upon transmission of the result message, the Transaction Object is removed from the CS's [2] work queues and memory, and new Transaction Objects (if any) may then be processed.

Note that in a large-scale embodiment, the inventive system is likely to process a large volume of Transaction Messages and Transaction Objects concurrently, via multi-threaded processing and load-balancing among multiple processors and subsystems, and its design should not be construed as requiring serial processing of Transaction Messages and Transaction Objects.

Communications Control Layer and Communications Subsystems

The Communications Control Layer [203] of the preferred embodiment of the inventive system coordinates and manages the activity of the Communications Subsystems. The CCL [203], in addition to sharing the basic elements of the CS [2] as described above, is comprised of software specific to the establishment and management of simultaneous communications link sessions across a plurality of media. Said software may be implemented using such software frameworks and with such application development tools and platforms as CallXML (an open-source mark-up language for creating server-based interactive telecommunications applications) or the Adaptive Communications Environment (an open-source software framework and library for managing signaling, events, dynamic reconfiguration of services, and concurrent process synchronization for multithreaded real-time communications).

The Communications Subsystems are of three general types: 1) telephony-related for voice and audio communications, 2) Internet- and data-related for data and text messaging, and 3) specialty data-network related, for certain other types of data transfer such as EDI and SNA/RJE. The Communications Subsystems are each comprised of hardware and software for transmitting and receiving signals to and from a specific class of devices (terminals) over a particular communications link or links or communications network or networks using a specific protocol or family of protocols. Each is further comprised of a collection of logical and physical ports, or other equivalent interfaces, each capable of sustaining concurrent communications with one, or more where applicable, individual device(s) and/or terminal(s) across a corresponding communications link or network. (Said devices and networks are presumed to be external to the inventive system, but in other embodiments need not be.)

A high-level representation of a subset of the communications links and media supported by a preferred embodiment of the inventive system is shown in FIG. 1. A complete, low-level representation of the communications media, interfaces, links, and potentially supported devices for each Communications Subsystem for an embodiment of the inventive system is presented individually from FIG. 11 to FIG. 24 inclusive.

The Communications Subsystems provide a layer of abstraction to the CCL [203], which is then able to interact with the various communication media and devices of the party or parties to a transaction in terms of generic communication sessions.

The following tables relate the communications devices and media and the networks which support them, per the aforesaid Figures. The first table identifies the media explicitly shown in FIG. 1.

TABLE 1

Profiled Communication Media,
Related Networks, and Devices per FIG. 1

| Communications Medium [Interface, Link] | Associated Network | Possible Device(s) |
|---|---|---|
| Telephony [211, 511] | Public Switched Telephone Network [231] | Telephone, Key system, PBX with extentions, PBX with direct-dial, IVR, automated attendant [611] |
| Electronic mail [212, 512] | Internet Protocol networks (such as the Internet) [233], private data networks (such as frame relay networks), public data networks (such as the MCI Mail network) and services (such as America Online) [232] | Electronic mail software, e-mail appliance, mobile e-mail device (such as a PDA), e-mail capable cell phone or pager [612] |
| Instant Messaging [213, 513] | Internet Protocol networks (such as the Internet) [233] and IM-capable services (such as America Online) [232] | Instant messaging software, mobile IM device, IM-capable cell phone or pager [613] |
| Facsimile [214, 514] | Public Switched Telephone Network [231] or an IP fax service or network (such as by Easylink Services Corp.) | Fax machine, fax server, fax modem, virtual fax inbox system [614] |
| Paging [215, 515] | Paging network (such as by SkyTel) [234] | Pager, paging-capable cell phone [216] |
| Short Message Service/Wireless Text Messaging [216, 516] | Wireless data/telephony network, PCS network [235] | Mobile text messaging device, text-capable cell phone, iMode phone [616] |
| Wireless Telephony [217, 517] | Wireless telephone network, PCS network [235] | Cellular telephone [617] |

The following table shows media, networks, and devices are covered indirectly in FIG. 1 under [218+], [236+], and [625+], but which are explicitly described in FIG. 18-FIG. 24, inclusive. (Note that it is the intent of 1 [218+], [236+] and [625+] additionally to define of the inventive system to be expanded to accommodate additional or alternative communications media, networks, and/or devices over time as they become desirable and/or available, and/or as implemented communication media, networks, and/or devices cease to be available and/or desirable.)

TABLE 2

Additional Profiled Communication Media,
Related Networks, and Devices per FIG. 18-FIG. 24

| Communications Medium [Interface, Link] | Associated Network | Possible Device(s) |
|---|---|---|
| Additional or alternative media, as become desirable/ available [FIG. 1, 218+] | Additional or existing networks as they come to support said additional/alternative media [FIG. 1, 236+] | Additional or existing devices as they come to support said additional/alternative media [FIG. 1, 625+] |
| IP Telephony [FIG. 18, 218, 518] | Public and private Internet Protocol networks (such as the Internet) supporting IP telephony standards such as H.323 [233], and the PSTN by using an IP telephony gateway [231] | Telephone, Key system, PBX or IP PBX with extentions, PBX or IP PBX with direct-dial, IP telephone, IVR, automated attendant [618] |
| Internet Data Protocols including HTTP/HTTPS using HTML/ XML [FIG. 19, 219, 519] | Public and private Internet Protocol networks (such as the Internet) [233] | Web server, or browser-based system or device [619] |
| Wireless Access Protocol (WAP) [FIG. 20, 220, 520] | Wireless Internet Protocol networks [233] and wireless networks supporting Internet access through a wireless-Internet gateway [235] | WAP-capable mobile device or cellular phone [620] |
| Telex [FIG. 21, 221, 521] | Telex network [236] | Telex terminal or Telex mailbox service [621] |
| File Transfer (FTP) [FIG. 22, 222, 522] | Internet Protocol networks (such as the Internet) [233], private data networks (such as frame relay networks) and public data services (such as America Online) [232] | FTP server [622] |
| SNA/RJE [FIG. 23, 223, 523] | SNA network [237] or an SNA-tunneling or -emulating data network [232] | RJE capable system or device (such as an IBM S/390 mainframe computer with IBM 3770 RJE terminal or equivalent) [623] |
| EDI/ EDIFACT/ EDI-INT [FIG. 24, 224, 524] | EDI Value-Added-Network (such as the Sterling Commerce VAN) or an EDI-capable IP network or service (such as by Internet Commerce Corp.) [238] | EDI capable server (such as by Sterling Commerce, a unit of SBC Corp.) |

The CCL [203] initiates one or more concurrent, multi-threaded processes which queue requests to obtain communication ports from one or more of the Communications Subsystems [FIG. 11-FIG. 24] and then direct the Communications Subsystems in establishing communication with and/or to the party or parties to the transaction according to the Script and Environment Variables of the Transaction Object. The Script and Environment Variables, based on the data obtained from the Profiles, Groups, Rule Set and Communications Sequence Patterns database views [FIG. 5-FIG. 8], identify the parties and their communication devices for the given transaction, define a sequence for the occurrence of communications with and/or to each applicable party, and specify which communications links, networks, and protocols/media to use at various points within said sequence.

The preferred embodiment of the inventive system provides for three generalized sequences for contacting a party:

1) attempting to reach each device associated with that party sequentially, 2) attempting to reach each device associated with that party in parallel, and 3) combinations thereof. Further, each device may be tried several times in succession until contact is established with it, as defined in its associated Communications Sequence Pattern [FIG. 8]. The Environment Variables include information for the CCL [203] and Communications Subsystems to use for timing out on an individual attempt and on a sequence of attempts. The CCL [203] coordinates these patterns of communication attempts through to their logical conclusion.

The inventive system also provides, through a corresponding Communications Sequence Pattern definition, a mechanism to allow a party to initiate contact with the system within an allowed time interval, using the Environment Variable "Inbound/Outbound" [FIG. 8, 8c] in conjunction with "Attempt Timeout Value" [8d] and "Sequence Timeout Value" [8e]. For this to occur, the communication address (such as a telephone number or Instant Messaging ID) of the device used by the party must be universally and securely detectable by the appropriate Communication Subsystem interface, such as with Automatic Number Identification (ANI) service for devices using the Public Switched Telephone Network [FIG. 11, 231] by the Telephony Interface [211].

When attempting to establish contact with a party's device, the appropriate Communications Subsystem executes a cycle of attempts, the timing of which is defined by the values for the corresponding Communications Sequence Pattern's fields, shown in FIG. 8, specifically the values for First Attempt Delay [8f], Smart Retry Flag [8g], Maximum Number of Attempts [8h], and Attempts Spacing [8i]. The use of these party- and device-specific, user-predefined parameters to guide the inventive system in its interaction attempts with a party provides the invention with the advantage of a high degree of flexibility and effectiveness in getting through to a party with a minimum of difficulty.

First Attempt Delay [8f], if specified, provides for a user-defined time to elapse prior to the first contact attempt, so that, for example, the party may change a dual-use line from data mode to telephone mode for the purpose of receiving a telephony-based contact.

Smart Retry Flag [8g], if True, indicates that the Communications Sequence Pattern for the device shall be self-modifying (under the control of the CCL [203]) based on the outcome of each successive contact attempt. Particularly for telephony-based communications, this mechanism allows the inventive system to change the timing and quantity of future attempts based on the condition of the device (or network) being reached, as reported by such network to the respective Communications Subsystem interface. For example, Instant Messaging services provide a status indicator which may include values such as "Active", "Busy" or "Off line"; telephony networks respond with, among others, answer-supervision (i.e., signaling that the call has been answered), busy signals, or repeated rings without answer. Smart Retry provides, for example, for increasing the frequency and number of attempts in "busy" cases, decreasing in "off line"/"ring no answer" cases.

Maximum Number of Attempts [8h] defines the total number of attempts the inventive system should make to reach a device before the respective Communication Sequence Pattern is deemed exhausted. This value may be modified dynamically by the CCL [203] if the Smart Retry Flag [8g] is set.

Attempts Spacing [8i] defines the time intervals between successive attempts, either as a general value, or as specific values for each attempt in the Sequence. This value may be modified dynamically by the CCL [203] if the Smart Retry Flag [8g] is set.

As shown in FIG. 25, in the "Communication Session" process block, an active communication session with a party's device is comprised of the following generic cycle of functional execution of elements of the preferred embodiment of the inventive system and corresponding process steps:

For the first successful "Confirm" Role session and for all "Notify" sessions, as such Roles [FIG. 6, 6k; FIG. 7, 7e] and associated Scripts [FIG. 9, FIG. 26] may be defined in a given embodiment of the invention, an associated message template, per FIG. 10, is defined in the Environment Variables [FIG. 26: "MessageTemplate[n]"] accessible to said Script. In a typical embodiment of such a Script, as soon as a communication link session is reported as open and active by the corresponding Communications Subsystem, the Script execution process/thread begins composing and transmitting the various segments of said message template to the communication device [FIG. 25, G], formatted according to the capabilities and limitations of the communication device. For example, in a telephony communication link session, the message may be reformulated by the use of a text-to-speech processor [FIG. 11, 711a], and prerecorded audio may be interpolated by the Telephony Interface [211] or related IVR processor [711b], whereas for an Internet HTTP session using XML, the message may be reformatted using a referenced XML stylesheet (XLS), and text- or image-based components may be substituted for audio components of the message.

Particularly in the case of communications sessions requiring input from the reached party, the message may consist of multiple segments that are composed and delivered to the party's communication device serially by the appropriate Communications Subsystem.

If an input is indeed required [FIG. 25, H], and the device supports it (per the Communication Sequence Pattern [FIG. 8, 8b: "Interactivity Flag"]), the executing Script process will preferably prompt for and wait to receive input from the party. The form of the input depends on the nature of the communication device and medium; for telephony-class devices, it is typically and preferably in the form of DTMF tones produced by touch-tone dialing or, additionally or alternatively, via voice, requiring the use of a voice recognition processor [FIG. 11, 711c]; while for Internet- and data-type devices, it is typically and preferably through a return message (such as HTML <FORM METHOD="POST">, e-mail SMTP reply, Instant Messaging text reply); and, for a specialty device or terminal, such as an SNA/RJE device, it is typically and preferably through a specifically formatted data exchange particular to the protocol being employed.

The Script may define whether the input must be validated before proceeding, and if so, may give the party multiple attempts to enter correct information before abandoning the attempt. Such attempts at receiving input may further be governed by Timeout parameters (see FIG. 26, "Transaction/Communication Session Object Properties"), such that, when the indicated time has elapsed, the attempt is abandoned [FIG. 25, J]. In an out-of-time case, or in such case as a predefined number of input attempts is initiated over the communication link session without successful validation, the Script delivers a timeout message segment if so defined in the message template [K].

If input was prompted for, a corresponding Environment Variable flag is set (see FIG. 26: "PartyConfirmContact[n]")

to identify that a "Confirm" Role session has attempted to gain input required from the party.

At the conclusion of any and all input-gathering and delivery of message segments, the communication link session is terminated (by the Communications Subsystem, and optionally by the party as well if the party reacts more quickly than the Communications Subsystem). The results may be stored [L] for use by the system later on.

If the session was successfully initiated (whether or not correct input was actually received), and was, for example, a "Confirm" Role session, as may have been indicated through the use of the aforesaid PartyConfirmContact[n] Environment Variable, further attempts to contact the party in a "Confirm" Role (or equivalent, based on the embodiment of the inventive system) are preferably disabled for the current transaction.

For all non-"Confirm" devices, and if a "Confirm" Role contact has not yet been made successfully on any "Confirm" Role device, for example, the processes/threads executing the Communication Sequence Patterns in regard to the corresponding devices continue.

After the failure of an attempt, the attempt parameters and corresponding failure data provided by the appropriate Communication Subsystem are preferably logged in the system's databases or other volatile or nonvolatile memory or storage and, if there are further attempts allowed, per the effective Maximum Number of Attempts setting [FIG. 8, 8h], the thread of execution for the applicable Communication Sequence Pattern waits until the next attempt should be made, per 1) the Attempts Spacing value [8i] corresponding to the next attempt in the Sequence, and/or 2) the Smart Retry setting [8g], as described above. This is shown in FIG. 25's "Wait per device's attempt schedule" process box [O].

If the attempt schedule is exhausted, the executing process may initiate a new process with a new Communication Sequence Pattern, if such additional Sequence is defined for use upon the unsuccessful exhaustion of the current one [FIG. 8, 8j: "Action on Final Failure"].

This mechanism, an innovative advantage of the inventive system, allows the chaining of Communication Sequence Patterns to arbitrary lengths, executing until success occurs or the final Sequence in the chain of Sequences fails. It is also possible thereby (if only sometimes desirable) to set up an endless cycle of communication attempts through self-referencing chains of Sequences, such that the inventive system will attempt to establish contact with a party indefinitely, until successful. This is particularly useful in the case of a transaction which, by its nature and that of its parties, indicates an emergency situation, such as an authorization transaction (non-commercial in nature) regarding the entry by some party to a restricted or secured area or system, or an extremely urgent and critical commercial transaction requiring immediate confirmation by a party not otherwise directly engaged therein at the time.

It is further possible and desirable, under certain conditions, to establish an inbound Communication Sequence Pattern [FIG. 8, 8c], to be initiated by the party, as a follow-on Sequence to an outbound Sequence. For example, a wireless text message may be sent to the party's cellular telephone, which text message includes a callback hyperlink to an embodiment of the inventive system's Telephony Communications Subsystem Interface [FIG. 11, 211]. Simultaneously, an inbound Communication Sequence Pattern is established which waits for contact from the party, similar to the underlying contact mechanism described in U.S. Pat. No. 5,727,163 to Bezos. The party, by responding to the callback hyperlink in the wireless text message, then interacts with the Telephony Interface and is joined to the executing process which has been waiting for his/her inbound contact.

The following Table 2 presents component technologies which may be used by one skilled in the art to construct the communications interfaces and links shown in FIG. 11-FIG. 24.

TABLE 3

Possible Components of Communication Subsystems Embodiments

| FIG. | Interface | Example | Additional system resources | Example |
|---|---|---|---|---|
| 11 | Telephony [211] | Intel ® Dialogic ® DM/V1200-4E1 and D/320-PCI voice cards, Intel ® CT Media software | Text to speech processor [711a] IVR [711b] Voice recognition processor [711c] | Nuance Communications, Inc.'s Vocalizer Intel ® CT Media Persay Inc.'s Orpheus Speaker Verification Platform |
| 12 | E-mail [212] | Sendmail Consortium's Sendmail e-mailing software | | |
| 13 | Instant Messaging (PC-based and wireless) [213] | Jabber, Inc.'s Jabber Communications Platform | | |
| 14 | Fax [214] | Intel ® Dialogic ® DM/F300-E1 fax cards, Intel ® CT Media software | Text to fax processor [714a] | Inso's Outside In Server |
| 15 | Paging [215] | Sendmail Consortium's Sendmail (for initiating SMTP-based alphanumeric pages) | | |

TABLE 3-continued

Possible Components of
Communication Subsystems Embodiments

| FIG. | Interface | Example | Additional system resources | Example |
|---|---|---|---|---|
| 16 | Wireless Text/ SMS [216] | Simplewire, Inc.'s Java SMS middleware, or Nokia Corp.'s Multimedia Email Gateway (and SMTP-to-SMS server) | | |
| 17 | Wireless Telephony [217] | As Telephony above | Text to speech processor [711a] IVR [711b] Voice recognition processor [711c] | Nuance Communications, Inc.'s Vocalizer Intel ® CT Media Persay Inc.'s Orpheus Speaker Verification Platform |
| 18 | IP Telephony [218] | Intel ® Dialogic ® DM/IP301-1E1 IP Link boards for H.323 and CT Media software | Text to speech processor [711a] IVR [711b] Voice recognition processor [711c] | Nuance Communications, Inc.'s Vocalizer Intel ® CT Media Persay Inc.'s Orpheus Speaker Verification Platform |
| 19 | Web-based (HTTP, HTTPS, etc. using HTML, XML, etc.) [219] | IBM Websphere Application Server and HTTP Server; optionally, IBM MQSeries Everyplace | | |
| 20 | WAP [220] | Nokia Corp.'s Activ Server | | |
| 21 | Telex [221] | | | |
| 22 | FTP [222] | IBM MQSeries FTP SupportPac | | |
| 23 | SNA/RJE [223] | IBM 377x Emulator; an inherent function in any IBM S/390-or Z-class system | In a non-IBM system, an ASCII-EBCDIC converter | Sun Microsystems, Inc.'s SunLink SNA 3770/RJE software |
| 24 | EDI/EDIFACT/ EDI-INT [224] | Sterling Commerce's GENTRAN: Server and OFTP Plus | EDI translator [724a] | Sterling Commerce's GENTRAN: Server |

It is increasingly possible and practical for the physical interfaces and ports, such as those described above, to be substituted by Internet Protocol connections to service providers and service bureaus which accept IP-based inputs (such as SMTP-formatted e-mails) and translate and deliver such inputs to other types of device, such as fax, telex, and mobile browser-based devices. The inventive system, per its potential embodiment(s) described herein, does not purport to specifically require any particular interface type for the stated communication links or communication media, nor to require that message conversion occur within the inventive system, rather than in and by an external service provider's system(s). The full scope and capability of the inventive system and method are enumerated in the invention's claims.

Message Templates

As shown in FIG. 10, message templates are preferably comprised of free-form text with embedded field substitution codes and file insertion codes, which may be of a form such as "$xxx$", where 'xxx' is the name of an Environment Variable (see FIG. 26), $file://yyyyy$ where 'yyyyy' is a filepath on the Central System [2], or a Uniform Resource Locator (URL) accessible to the Central System [2], and $=zzzz (xxx1,xxx2, ...)$, where 'zzzz' is a script function name and 'xxx1', 'xxx2', etc. are Environment Variables passed to the function identified by 'zzzz'. In the "file" case, the contents of said file are inserted in the message template in place of the "$file:// ... $" marker. In the other two cases, the variable or function is evaluated and the results thereof are inserted in place of the substitution marker.

The use of a URL to supply some or all message contents is a powerful innovation, because it allows remote content and even remote templates to be included dynamically and programmatically on a transaction-by-transaction basis (that is, without requiring any user-initiated changes or updates to the inventive system or its databases' contents whatsoever).

A message template is defined by an ID and by a language [10b], such as "English". Therefore, a single message template may have multiple instances across multiple languages, distinguished by the values in the "Language" field from record to record. A corresponding currency name may also be associated for use with financial content in the message template, as per FIG. 5 [5e].

In some circumstances, a stylesheet retrieved and referenced by a Universal Resource Locator (URL) or Universal Resource Identifier (UDI) may be substituted for a stored message template or a message template passed to the central system [2] in the incoming Transaction Message. This powerful innovation allows mark-up methods of message content definition and formatting definition to be applied remotely to the inventive system, on a transaction-by-transaction basis, dynamically and programmatically (that is, without requiring any user-initiated changes or updates to the inventive system or its databases' contents whatsoever).

Rule, Profile, Script, Communication Sequence Pattern, and Message Template Management Prior to first use of the preferred embodiment of the inventive system, at least one entry is required in each of its various database views [FIG. 5-FIG. 8] (excluding the Group view), representing a default Rule Set, Party Profile, Communication Sequence Pattern, Action Script, and Message Template for at least one type of transaction and at least one party from one RTE [1]. Such data entry may be performed by an operator of the CS [2] through a means such as a web-browser-based interface, as shown in FIG. 1 [251: "User Web Client"], or by remotely loading values into the database tables through a database loader utility, or by using a programmatic interface for performing remote database updates. Subsequent modifications may be performed in a like manner.

An authorized user may log into the inventive system and, upon being granted access thereby, may view data and log records related to his account and edit his/her Profile and select from among predefined Communication Sequence Patterns. (If a superuser, s/he may view and edit the accounts and Profiles, Rules Sets, and Communication Sequence Patterns of others within his/her proscribed range of access.)

In practice, parties having a potential interest in transactions which may be processed by the inventive system will tend to updated their own Profiles as may regard their preferred communication devices, Sequences of contact thereon, preferred language, and related Roles, for various transaction types which the operator or other user of the inventive system may provide to them, per the specific embodiment of the inventive system. The operator or other user of the inventive system will tend to manage and update all other information, particularly rule- and message-oriented information.

Although the present invention has been described in relation to particular embodiments thereof, many other variations and modifications and other uses will become apparent to those skilled in the art. Therefore, the present invention is not limited by the specific disclosure herein.

What is claimed is:

1. A computer-implemented system for providing a transaction, the system comprising:
   a transaction processing module configured to process a transaction and to communicate via a first communications link and one or more second communications links, wherein the transaction processing module:
   receives, via the first communications link, incoming information associated with a transaction;
   identifies at least one party associated with the transaction, wherein the at least one party is authorized to verify the transaction and is a non-merchant with regards to the transaction;
   transmits, via the one or more second communications links, a verification request to the at least one party to verify the transaction, wherein the one or more second communications links are different from the first communications link;
   recognizes an occurrence of an event;
   determines authenticity of the transaction based on the recognition of the occurrence of the event; and
   continues processing the transaction initiated over the first communications link.

2. The system of claim 1, wherein the transaction is at least one of a commercial or a financial transaction.

3. The system of claim 1, wherein the at least one party is identified based on information from at least one of the incoming information and an external source.

4. The system of claim 3, wherein the external source is at least one of a data storage unit.

5. The system of claim 3, wherein the at least one party is identified by a unique party identifier.

6. The system of claim 5, wherein the unique party identifier is at least one of a name, at least one DTMF tone, a vocalization, an image, a username, a user ID, a PIN number, a tax ID, a telephone number, an account number, a credit card number, a CVC2 code, a CVV2 code, a CID code, a passcode, a user-defined party identifier, and all or part of a Social Security Number.

7. The system of claim 5, wherein the unique party identifier is organized and stored in a user profile.

8. The system of claim 7, wherein the user profile is modifiable.

9. The system of claim 7, further comprising a rules module having one or more rules for governing behavior of the transaction based on data in the user profile.

10. The system of claim 9, wherein the one or more rules are modifiable.

11. The system of claim 1, wherein the occurrence of the event comprises an absence of a response, via the one or more second communications links, within a predetermined time period.

12. The system of claim 1, wherein the occurrence of the event comprises receiving, via the one or more second communications links, one or more communications responsive to the verification request from the at least one party within a predetermined time period.

13. The system of claim 12, wherein the transaction processing module verifies the transaction by receiving at least a verifying response from the at least one party within the predetermined time period.

14. The system of claim 12, wherein the transaction processing module verifies the transaction by receiving additional information from the at least one party within the predetermined time period.

15. The system of claim 14, wherein the additional information comprises at least a unique verification identifier.

16. The system of claim 15, wherein the unique verification identifier comprises at least one of a name, one or more DTMF tones, a vocalization, an image, a username, a user ID, a PIN number, tax ID, telephone number, an account number, a credit card number, a CVC2 code, a CVV2 code, a CID code, a password, a passcode, a user-defined party identifier, and a Social Security Number.

17. The system of claim 15, wherein the transaction processing module authenticates the at least one party associated with the transaction by matching the unique verification identifier with data stored in one or more databases connected to the transaction processing module.

18. The system of claim 12, wherein the one or more communications are automatically self-adjusting and self-optimizing based on transaction processing.

19. The system of claim 12, wherein the one or more communications are formatted based on at least one of type of communications, content of communications, and communication devices.

20. The system of claim 12, wherein the one or more communications are formatted to at least one of a universal resource locator (URL) format, a universal resource identifier (URI) format, and a universal description, discover, and integration (UDDI) format.

21. The system of claim 12, wherein content of the one or more communications is formatted into at least one of an XML document and XLS stylesheet.

22. The system of claim 12, wherein the one or more communications are formatted based on at least one regional setting.

23. The system of claim 22, wherein the regional setting comprises at least one of language, currency, time zone, numeric format, currency format, and date format.

24. The system of claim 12, wherein the transaction processing module determines the authenticity of the transaction with the at least one party via at least one additional communications link.

25. The system of claim 24, wherein the one or more communications over the one or more second communications links and one or more communications over the additional communications link are simultaneously communicated.

26. The system of claim 1, wherein the first communications link and the one or more second communications links communicate via at least one of public switched telephone network (PSTN), wireless telephony, text messaging, short message service (SMS), Internet, telex, paging service, email, an EDI/EDIFACT/EDI-INT network, an IBM System Network Architecture/Remote Job Entry (SNA/RJE), SMTP, HTML, XHTML, and XML.

27. The system of claim 1, wherein the one or more second communications link utilizes middleware having a message queuing capability.

28. The system of claim 1, wherein determining authenticity of the transaction further comprises selecting one or more second communications links based on at least one of default order, preference, type of communications device, and signal strength.

29. The system of claim 1, further comprising a transmitter connected to the transaction processing module, the transmitter configured to notify the at least one party associated with the transaction after the transaction has been processed.

30. The system of claim 29, wherein notification is sent via at least one of the first communications link and the one or more second communications links.

31. The system of claim 1, further comprising a normalization module for normalizing the incoming information into a standardized format to create normalized information, wherein the transaction is processed based on the normalized information.

32. A computer-implemented method for providing a transaction, the method comprising:
   receiving, via a first communications link, incoming information associated with a transaction;
   identifying, by a computer, at least one party associated with the transaction, wherein the at least one party is authorized to verify the transaction and is a non-merchant with regards to the transaction;
   transmitting, via a second communications link, a verification request to the at least one party to verify the transaction, wherein the second communications link is different from the first communications link;
   recognizing, by a computer, an occurrence of an event;
   determining, by a computer, authenticity of the transaction based on the recognition of the occurrence of the event; and
   processing the transaction initiated over the first communications link.

33. The method of claim 32, wherein the transaction is at least one of a commercial or a financial transaction.

34. The method of claim 32, wherein the at least one party is identified based on information from at least one of the incoming information and an external source.

35. The method of claim 34, wherein the external source is at least one of a data storage unit.

36. The method of claim 34, wherein the at least one party is identified by a unique party identifier.

37. The method of claim 36, wherein the unique party identifier is at least one of a name, at least one DTMF tone, a vocalization, an image, a username, a user ID, a PIN number, a tax ID, a telephone number, an account number, a credit card number, a CVC2 code, a CVV2 code, a CID code, a passcode, a user-defined party identifier, and all or part of a Social Security Number.

38. The method of claim 36, wherein the unique party identifier is organized and stored in a user profile.

39. The method of claim 38, wherein the user profile is modifiable.

40. The method of claim 38, further comprising a rules module having one or more rules for governing behavior of the transaction based on data in the user profile.

41. The method of claim 40, wherein the one or more rules are modifiable.

42. The method of claim 32, wherein the occurrence of the event comprises an absence of a response, via the one or more second communications links, within a predetermined time period.

43. The method of claim 32, wherein the occurrence of the event comprises receiving, via the one or more second communications links, one or more communications responsive to the verification request from the at least one party within a predetermined time period.

44. The method of claim 43, wherein the transaction processing module verifies the transaction by receiving at least a verifying response from the at least one party within the predetermined time period.

45. The method of claim 43, wherein the transaction processing module verifies the transaction by receiving additional information from the at least one party within the predetermined time period.

46. The method of claim 45, wherein the additional information comprises at least a unique verification identifier.

47. The method of claim 46, wherein the unique verification identifier comprises at least one of a name, one or more DTMF tones, a vocalization, an image, a username, a user ID, a PIN number, tax ID, telephone number, an account number, a credit card number, a CVC2 code, a CVV2 code, a CID code, a password, a passcode, a user-defined party identifier, and a Social Security Number.

48. The method of claim 46, wherein the transaction processing module authenticates the at least one party associated with the transaction by matching the unique verification identifier with data stored in one or more databases connected to the transaction processing module.

49. The method of claim 43, wherein the one or more communications are automatically self-adjusting and self-optimizing based on transaction processing.

50. The method of claim 43, wherein the one or more communications are formatted based on at least one of type of communications, content of communications, and communication devices.

51. The method of claim 43, wherein the one or more communications are formatted to at least one of a universal resource locator (URL) format, a universal resource identifier (URI) format, and a universal description, discover, and integration (UDDI) format.

52. The method of claim 43, wherein content of the one or more communications is formatted into at least one of an XML document and XLS stylesheet.

53. The method of claim 43, wherein the one or more communications are formatted based on at least one regional setting.

54. The method of claim 53, wherein the regional setting comprises at least one of language, currency, time zone, numeric format, currency format, and date format.

55. The method of claim 43, wherein the transaction processing module determines the authenticity of the transaction with the at least one party via at least one additional communications link.

56. The method of claim 55, wherein the one or more communications over the one or more second communications links and one or more communications over the additional communications link are simultaneously communicated.

57. The method of claim 32, wherein the first communications link and the one or more second communications links communicate via at least one of public switched telephone network (PSTN), wireless telephony, text messaging, short message service (SMS), Internet, telex, paging service, email, an EDI/EDIFACT/EDI-INT network, an IBM System Network Architecture/Remote Job Entry (SNA/RJE), SMTP, HTML, XHTML, and XML.

58. The method of claim 32, wherein the one or more second communications link utilizes middleware having a message queuing capability.

59. The method of claim 32, wherein determining authenticity of the transaction further comprises selecting one or more second communications links based on at least one of default order, preference, type of communications device, and signal strength.

60. The method of claim 32, further comprising a transmitter connected to the transaction processing module, the transmitter configured to notify the at least one party associated with the transaction after the transaction has been processed.

61. The method of claim 60, wherein notification is sent via at least one of the first communications link and the one or more second communications links.

62. The method of claim 32, further comprising a normalization module for normalizing the incoming information into a standardized format to create normalized information, wherein the transaction is processed based on the normalized information.

63. A computer readable medium comprising code to perform the acts of a computer-implemented method for providing a transaction, the method comprising:
- receiving, via a first communications link, incoming information associated with a transaction;
- identifying, by a computer, at least one party associated with the transaction, wherein the at least one party is authorized to verify the transaction and is a non-merchant with regards to the transaction;
- transmitting, via a second communications link, a verification request to the at least one party to verify the transaction, wherein the second communications link is different from the first communications link;
- recognizing, by a computer, an occurrence of an event;
- determining, by a computer, authenticity of the transaction based on the recognition of the occurrence of the event; and
- processing the transaction initiated over the first communications link.

* * * * *